(12) United States Patent
Kobayashi

(10) Patent No.: US 7,319,668 B2
(45) Date of Patent: Jan. 15, 2008

(54) NETWORK SYSTEM CAPABLE OF SELECTING OPTIMAL ROUTE ACCORDING TO TYPE OF TRANSMITTED DATA

(75) Inventor: Naofumi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 882 days.

(21) Appl. No.: 10/099,566

(22) Filed: Mar. 15, 2002

(65) Prior Publication Data
US 2003/0048750 A1 Mar. 13, 2003

(30) Foreign Application Priority Data
Aug. 31, 2001 (JP) ............................. 2001-264573

(51) Int. Cl.
*G01R 31/08* (2006.01)
(52) U.S. Cl. .................. 370/231; 370/237; 370/351; 370/392
(58) Field of Classification Search ...................... None
See application file for complete search history.

(56) References Cited

U.S. PATENT DOCUMENTS 5,485,455 A    1/1996   Dobbins et al.
6,493,317 B1 *  12/2002  Ma ............................. 370/237
6,678,248 B1 *  1/2004   Haddock et al. ............ 370/235
2002/0176363 A1 * 11/2002 Durinovic-Johri et al. .. 370/237

FOREIGN PATENT DOCUMENTS

JP    9-508509     8/1997
JP    11088428     3/1999
JP    11340977    12/1999
WO    WO 95/20850  8/1995

OTHER PUBLICATIONS

J. Moy, "RFC 1583, OSPF Verson 2", 1994, pp., cover, 1, & 22.*
U.S. Appl. No. 09/723,416, Fujitsu Ltd.

* cited by examiner

*Primary Examiner*—Chau Nguyen
*Assistant Examiner*—Jung Park
(74) *Attorney, Agent, or Firm*—Katten Muchin Rosenman LLP

(57) ABSTRACT

A network system, enabling the quality of the data to be ensured and efficient use can be made of the network, including at least one network relay apparatus provided with a discriminating unit for discriminating the type of data transmitted, a selecting unit for selecting the optimal route for each string of data in accordance with the discriminated type and destination, and a holding unit for holding the optimal routing information for each type of data and destination and sending received data toward the optimal route.

7 Claims, 32 Drawing Sheets

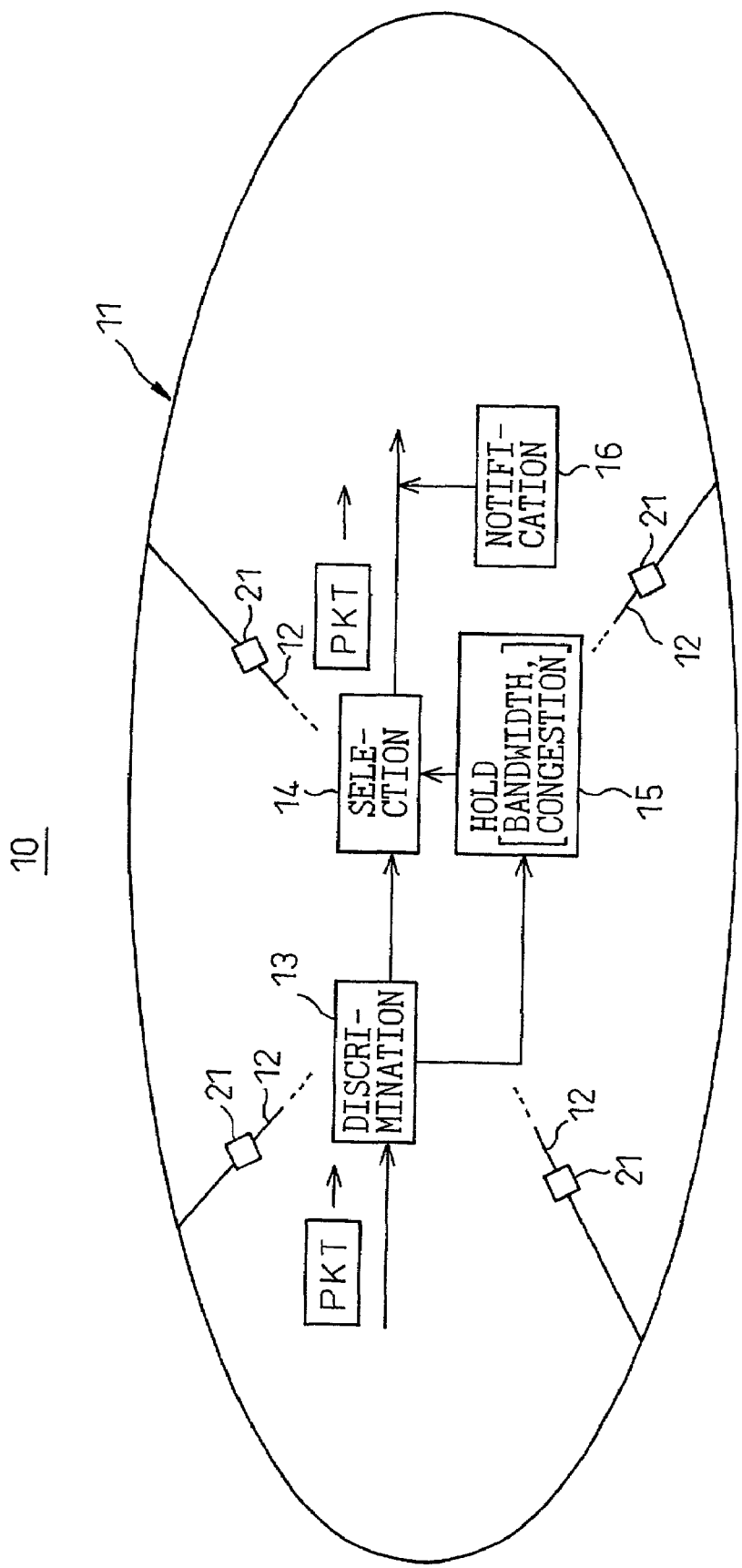

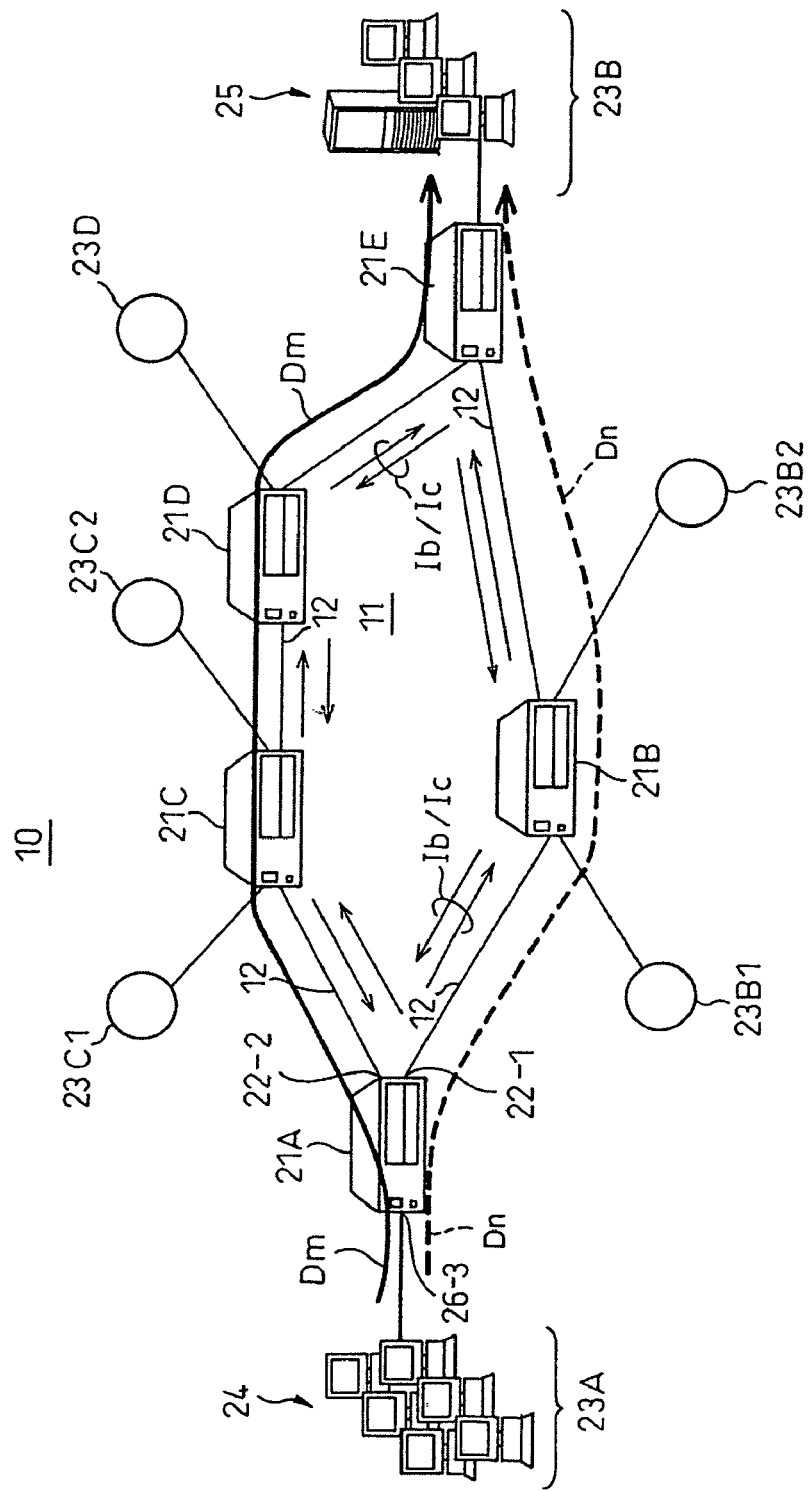

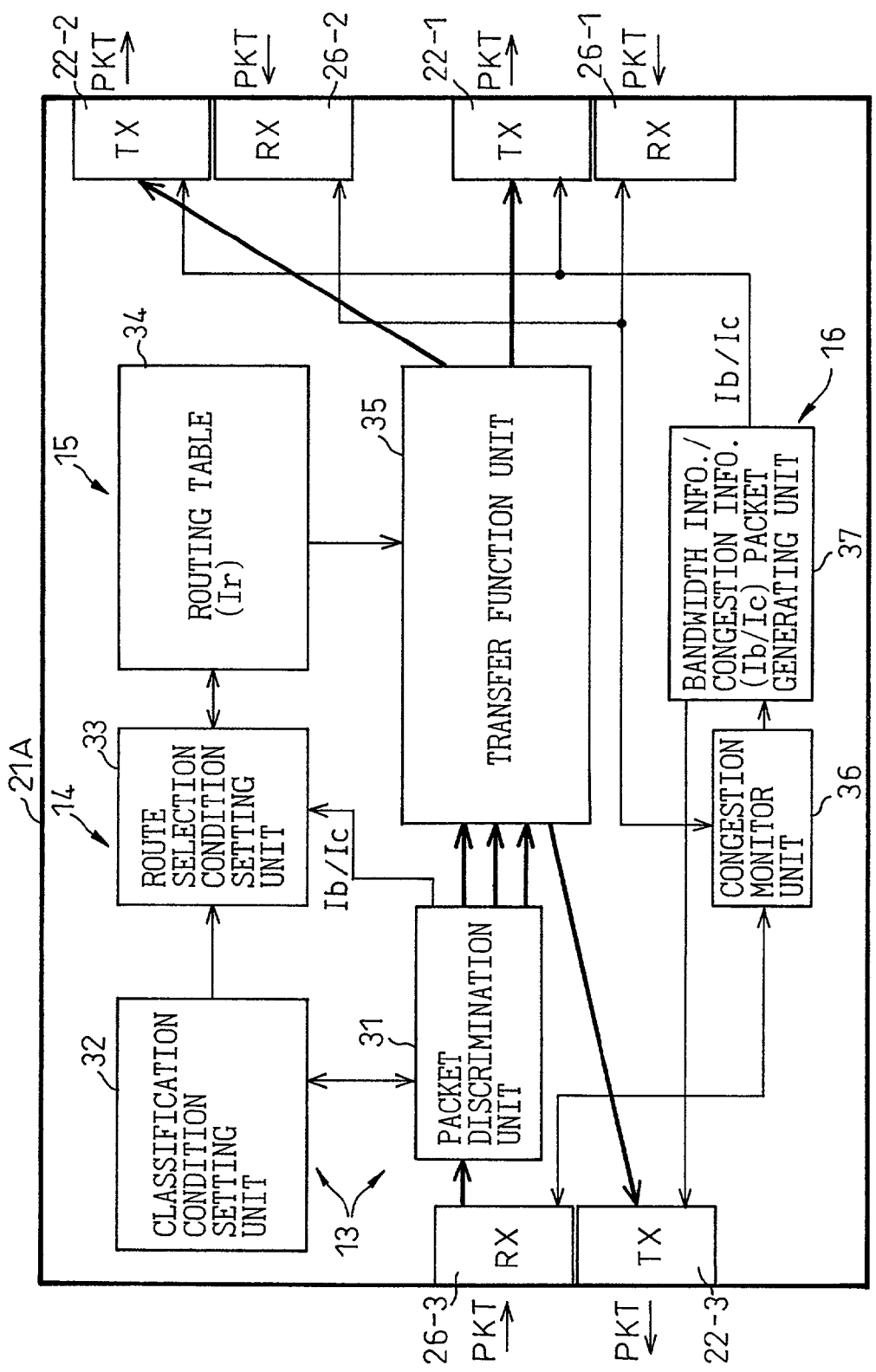

FIG. 4a

| DESTINATION | TYPE OF DATA | NEXT NETWORK RELAY APPARATUS | CONGESTION/ BANDWIDTH INFORMATION | TRANSMITTING PORT TX |
|---|---|---|---|---|
| * (ALL) | * (ALL) | TO FOLLOW ROUTING TABLE 34 | NON | TO FOLLOW ROUTING TABLE 34 |

FIG. 4b

| DESTINATION | TYPE OF DATA | CONGESTION/ BANDWIDTH INFORMATION (Ic/Ib) | NEXT NETWORK RELAY APPARATUS | TRANSMITTING PORT TX |
|---|---|---|---|---|
| SUBNETWORK 23B | TCP | NO CONGESTION /1.5M | ROUTER 21B | 22-1 |
|  | UDP | NO CONGESTION /3M | ROUTER 21C | 22-2 |
| ... | ... | ... | ... | ... |
|  | ... | ... | ... | ... |

FIG.7

TOPOLOGY DATABASE 51

| ROUTER ID | NETWORK ID | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | ○ | ○ | ○ | | | | | | | | | |
| 2 | | ○ | | ○ | | | | | ○ | | | |
| 3 | | | ○ | | ○ | | | | | ○ | | |
| 4 | | | | ○ | | ○ | | | | | ○ | |
| 5 | | | | | ○ | | ○ | | | | | ○ |
| 6 | | | | | | ○ | ○ | ○ | | | | |
| 7 | | | | | | | | | ○ | ○ | ○ | ○ |

FIG. 8

| ROUTE NO. | ROUTE SPANNING FROM NETWORK 1 TO NETWORK 7 | NUMBER OF STAGES OF ROUTERS |
|---|---|---|
| 1 | ROUTER1-ROUTER3-ROUTER5 | 3 |
| 2 | ROUTER1-ROUTER2-ROUTER7-ROUTER5 | 4 |
| 3 | ROUTER1-ROUTER2-ROUTER4-ROUTER6 | 4 |
| 4 | ROUTER1-ROUTER2-ROUTER7-ROUTER4-ROUTER6 | 5 |
| 5 | ROUTER1-ROUTER3-ROUTER7-ROUTER4-ROUTER6 | 5 |
| 6 | ROUTER1-ROUTER3-ROUTER2-ROUTER7-ROUTER5-ROUTER6 | 5 |
| 7 | ROUTER1-ROUTER2-ROUTER7-ROUTER3-ROUTER5 | 5 |
| 8 | ROUTER1-ROUTER3-ROUTER5-ROUTER7-ROUTER4-ROUTER6 | 6 |
| 9 | ROUTER1-ROUTER3-ROUTER7-ROUTER4-ROUTER6 | 6 |
| 10 | ROUTER1-ROUTER3-ROUTER7-ROUTER2-ROUTER4-ROUTER6 | 6 |

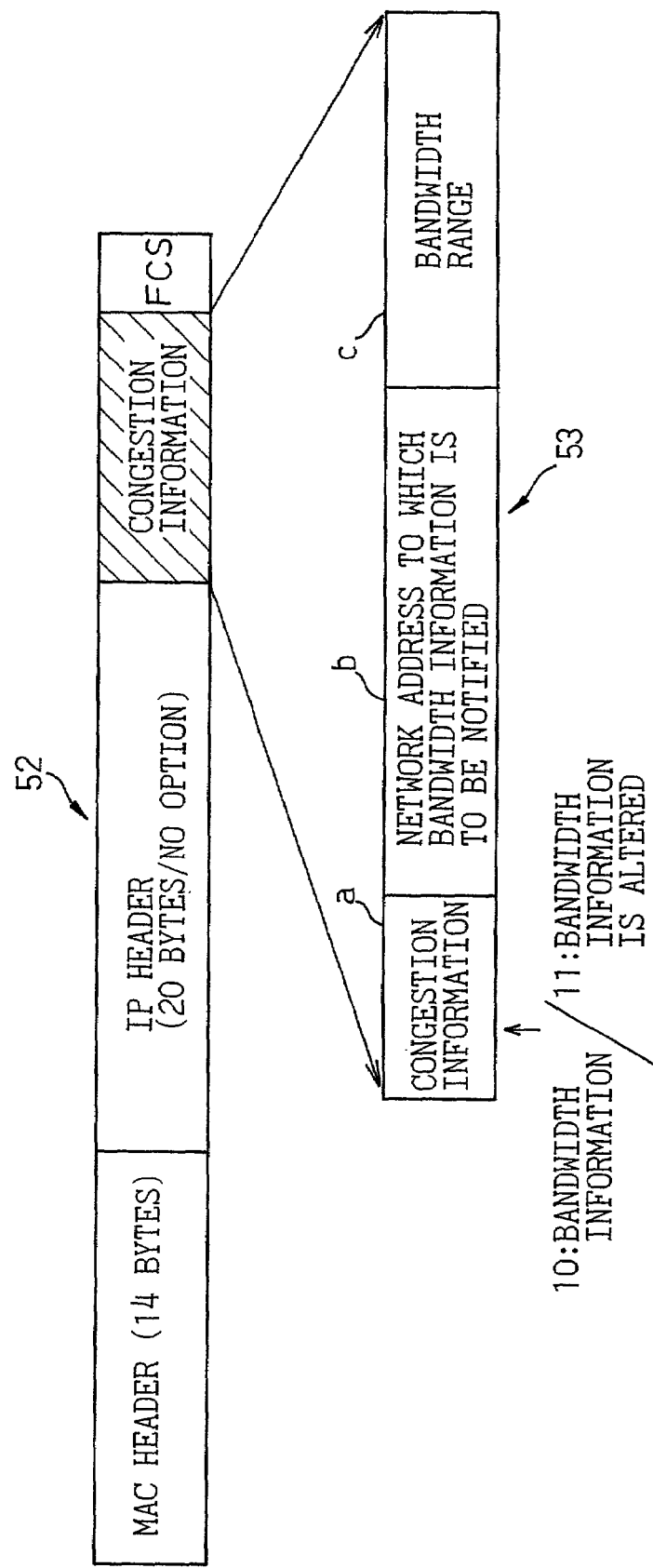

FIG.10

| NETWORK ID | 1 | 2 | 3 | 4 | 5 | 6 | 7 | 8 | 9 | 10 | 11 | 12 |
|---|---|---|---|---|---|---|---|---|---|---|---|---|
| BANDWIDTH RANGE | 5M | 1.5M | 1M | 3M | 1M | 4.5M | 5M | 4M | 5M | 3M | 2M | 1M |

| ROUTE NO. | ROUTE SPANNING FROM NETWORK 1 TO NETWORK 7 | NUMBER OF STAGES OF ROUTERS | BANDWIDTH INFORMATION ⟨MINIMUM BANDWIDTH⟩ |
|---|---|---|---|
| 1 | ROUTER1-ROUTER3-ROUTER5 | 3 | 1M |
| 2 | ROUTER1-ROUTER2-ROUTER7-ROUTER5 | 4 | 1M |
| 3 | ROUTER1-ROUTER2-ROUTER4-ROUTER6 | 4 | 2M |
| 4 | ROUTER1-ROUTER2-ROUTER7-ROUTER4-ROUTER6 | 5 | 1M |
| 5 | ROUTER1-ROUTER2-ROUTER7-ROUTER3-ROUTER4-ROUTER6 | 5 | 1M |
| 6 | ROUTER1-ROUTER2-ROUTER7-ROUTER4-ROUTER5-ROUTER6 | 5 | 1M |
| 7 | ROUTER1-ROUTER2-ROUTER7-ROUTER4-ROUTER7-ROUTER5 | 5 | 1M |
| 8 | ROUTER1-ROUTER3-ROUTER7-ROUTER4-ROUTER7-ROUTER3-ROUTER5 | 5 | 1M |
| 9 | ROUTER1-ROUTER3-ROUTER5-ROUTER7-ROUTER4-ROUTER6 | 6 | 1M |
| 10 | ROUTER1-ROUTER3-ROUTER7-ROUTER2-ROUTER4-ROUTER6 | 6 | 1M |

FIG.14

| DESTINATION | TYPE OF TRANSMITTING DATA | TRANSMISSION ROUTE CONDITION | MINIMUM BANDWIDTH | ROUTE TO BE USED |
|---|---|---|---|---|
| NETWORK 7 | TCP | MINIMUM BANDWIDTH IS LARGEST/ROUTE WHICH DOES NOT OVERLAP WITH ROUTE FOR UDP (d) | 2 M | 3 |
| | UDP * | SHORTEST ROUTE (e) | 1 M | 1 |
| ... | ... | ... | ... | ... |

FIG.18

| ROUTE NO. | ROUTE SPANNING FROM NETWORK 1 TO NETWORK 7 | NUMBER OF STAGES OF ROUTERS | BANDWIDTH INFORMATION ⟨AVERAGE BANDWIDTH⟩ |
|---|---|---|---|
| 1 | ROUTER1-ROUTER3-ROUTER5 | 3 | 1.00M |
| 2 | ROUTER1-ROUTER2-ROUTER7-ROUTER5 | 4 | 2.70M |
| 3 | ROUTER1-ROUTER2-ROUTER4-ROUTER6 | 4 | 3.10M |
| 4 | ROUTER1-ROUTER2-ROUTER7-ROUTER4-ROUTER6 | 5 | 3.13M |
| 5 | ROUTER1-ROUTER3-ROUTER7-ROUTER4-ROUTER6 | 5 | 2.38M |
| 6 | ROUTER1-ROUTER2-ROUTER7-ROUTER5-ROUTER6 | 5 | 1.7M |
| 7 | ROUTER1-ROUTER2-ROUTER4-ROUTER7-ROUTER5 | 5 | 1.75M |
| 8 | ROUTER1-ROUTER2-ROUTER7-ROUTER3-ROUTER5 | 5 | 2.75M |
| 9 | ROUTER1-ROUTER3-ROUTER7-ROUTER5-ROUTER4-ROUTER6 | 6 | 1.7M |
| 10 | ROUTER1-ROUTER3-ROUTER7-ROUTER2-ROUTER4-ROUTER6 | 6 | 3.3M |

FIG.19

| ROUTE NO. | ROUTE SPANNING FROM NETWORK 1 TO NETWORK 7 | NUMBER OF STAGES OF ROUTERS | BANDWIDTH INFORMATION ⟨MAXIMUM BANDWIDTH⟩ |
|---|---|---|---|
| 1 | ROUTER1-ROUTER3-ROUTER5 | 3 | 1M |
| 2 | ROUTER1-ROUTER2-ROUTER7-ROUTER5 | 4 | 5M |
| 3 | ROUTER1-ROUTER2-ROUTER4-ROUTER6 | 4 | 4.5M |
| 4 | ROUTER1-ROUTER2-ROUTER7-ROUTER4-ROUTER6 | 5 | 5M |
| 5 | ROUTER1-ROUTER3-ROUTER7-ROUTER4-ROUTER6 | 5 | 4.5M |
| 6 | ROUTER1-ROUTER3-ROUTER7-ROUTER5-ROUTER6 | 5 | 3M |
| 7 | ROUTER1-ROUTER2-ROUTER7-ROUTER4-ROUTER5 | 5 | 3M |
| 8 | ROUTER1-ROUTER3-ROUTER7-ROUTER4-ROUTER5 | 5 | 5M |
| 9 | ROUTER1-ROUTER3-ROUTER5-ROUTER7-ROUTER4-ROUTER6 | 6 | 4.5M |
| 10 | ROUTER1-ROUTER3-ROUTER7-ROUTER2-ROUTER4-ROUTER6 | 6 | 5M |

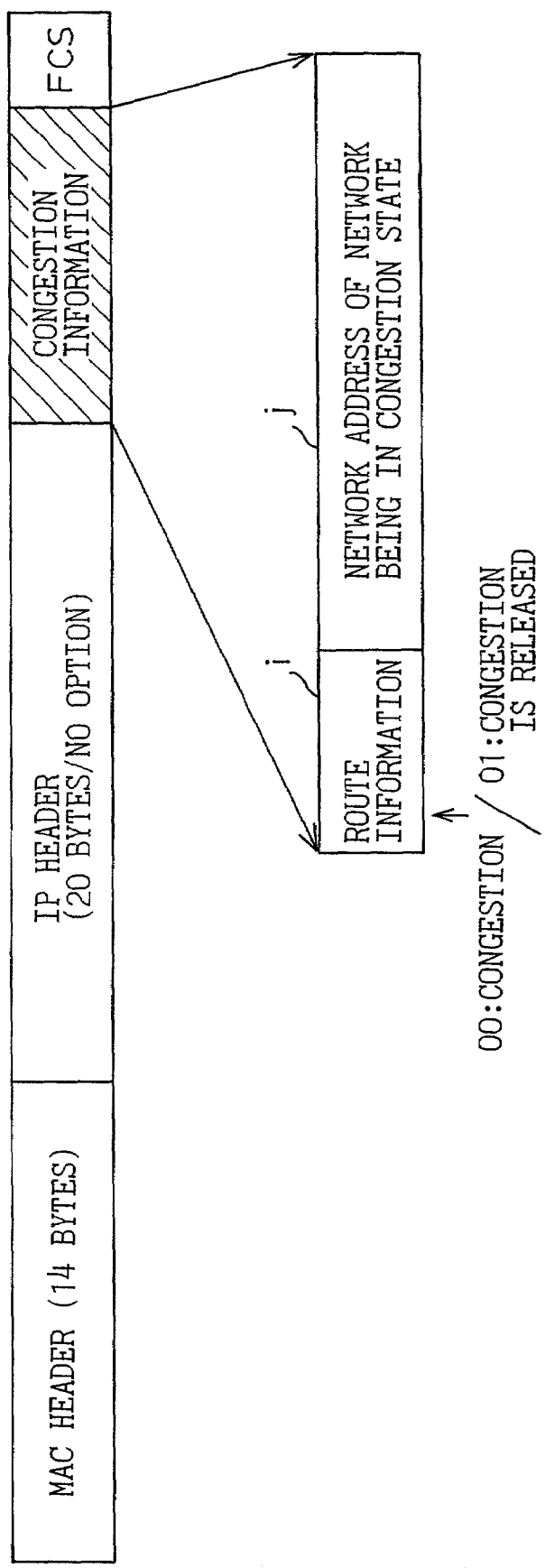

FIG. 23

| ROUTE NO. | ROUTE SPANNING FROM NETWORK 1 TO NETWORK 7 | NUMBER OF STAGES OF ROUTERS | BANDWIDTH INFORMATION ⟨MINIMUM BANDWIDTH⟩ | CONGESTION INFORMATION |
|---|---|---|---|---|
| 1 | ROUTER1-ROUTER3-ROUTER5 | 3 | 1M | × |
| 2 | ROUTER1-ROUTER2-ROUTER7-ROUTER5 | 4 | 1M | |
| 3 | ROUTER1-ROUTER2-ROUTER4-ROUTER6 | 4 | 2M | |
| 4 | ROUTER1-ROUTER2-ROUTER7-ROUTER4-ROUTER6 | 5 | 1M | |
| 5 | ROUTER1-ROUTER3-ROUTER7-ROUTER4-ROUTER6 | 5 | 1M | |
| 6 | ROUTER1-ROUTER2-ROUTER7-ROUTER5-ROUTER6 | 5 | 1M | |
| 7 | ROUTER1-ROUTER2-ROUTER4-ROUTER7-ROUTER5 | 5 | 1M | |
| 8 | ROUTER1-ROUTER2-ROUTER7-ROUTER3-ROUTER5 | 5 | 1M | × |
| 9 | ROUTER1-ROUTER3-ROUTER5-ROUTER7-ROUTER4-ROUTER6 | 6 | 1M | × |
| 10 | ROUTER1-ROUTER3-ROUTER7-ROUTER2-ROUTER4-ROUTER6 | 6 | 1M | |

FIG.24

| DESTINATION | TYPE OF TRANSMITTING DATA | TRANSMISSION ROUTE CONDITION | MINIMUM BANDWIDTH | ROUTE TO BE USED |
|---|---|---|---|---|
| NETWORK 7 | TCP | MINIMUM BANDWIDTH IS LARGEST/ROUTE WHICH DOES NOT OVERLAP WITH ROUTE FOR UDP/ CONGESTED ROUTE MUST NOT BE PASSED THROUGH (d) | 2M | 3 |
| | UDP * | SHORTEST ROUTE (e) | 1M | 6 |
| ... | ... | ... | ... | ... |

NETWORK SYSTEM CAPABLE OF SELECTING OPTIMAL ROUTE ACCORDING TO TYPE OF TRANSMITTED DATA

BACKGROUND OF THE INVENTION

1. Field of the Invention

The present invention relates to a network system for transferring for example IP data, a network relay apparatus forming one of components of that network system, a network relay monitor apparatus forming another one of components of that network system, and a method of network operation unique to that network system.

2. Description of the Related Art

In recent years, personal computers have spread rapidly through the public. Further, the Internet has taken off, corporate internet protocol (IP) networks (intranets) have grown in size, voice and data have been integrated in the IP (VoIP), and carriers have begun providing IP virtual private network (IP-VPN) services. IP data communications are becoming ever more important.

Further, networks themselves are becoming more sophisticated in function and in performance. E-mail and the World Wide Web (WWW) have spread and applications for reproduction of moving pictures and audio have become popular. Due to this, the total amount of data traffic has rapidly increased. Further, the networks themselves have been increased in speed. Along with this, use of large volume multimedia data has begun to spread.

Under the above circumstances, with network infrastructure being further built up, the data being transferred by IP diversifying and increasing, and further data communications (IP communications) expected to further spread in the future, much has to be considered when thinking of IP data communications as a whole, for example, (i) the drop in network performance due to the intermixture of traffic with different properties, (ii) the efficient use of networks as infrastructure, and (iii) the selection and control of optimal routes (traffic engineering).

This will be explained further. For example, comparing hypertext transfer protocol (http) traffic when referring to the WWW, where the amount of traffic is not that great with sporadic transfer of single strings of data, and multimedia traffic, where once data transfer begins, a large amount of data continues over a certain long period, while the same IP protocol is used for the two types of traffic, properties of the data differ. For example, on the one hand, the http is used for spreadsheets, viewing information, and other main jobs, while on the other hand, considering the case of use of moving pictures, one type of multimedia data, for entertainment etc., despite the importance of the former http traffic, when the former traffic and the latter multimedia traffic are mixed together, the transfer of data by http traffic and the display of and search for web pages end up taking time.

In multimedia communications, however, it is necessary to transmit data packets constantly using a certain bandwidth or else the data cannot be suitably reproduced at the end system. Further, in multimedia communications, sometimes a high quality display is required. In this case, the amount of traffic further increases, so the network has to ensure a sufficient bandwidth, measures have to be taken to avoid congestion, and measures have to be taken to separate transmission routes.

For this purpose, in the past, for example, in corporate networks, the only step taken has been to use simple preferential control functions of routers or other network relay apparatuses. Further, for services provided by carriers or Internet service providers (ISPs), the only step taken has been to connect footholds of contracting users by virtual private network services. Therefore, while the above simple preferential control is being provided, almost nothing is being done, at present, to manage congestion or manage bandwidth in the network.

Looking at management of congestion, in IP communications, congestion control functions currently rely on the slow start algorithm etc. of transmission control protocol (TCP) provided in the end systems rather than the network. Therefore, there is almost no technology for control of congestion or avoidance of congestion in the infrastructure, that is, the network portion.

Further, a look at the above multimedia traffic shows that data is usually transmitted by a user datagram protocol (UDP)/IP. There is no mechanism for control of congestion in the UDP. Therefore, TCP data transmitted under the above slow start algorithm end up being encroached upon by the UDP data in communications bandwidth.

To solve this problem, for example, there is the Resource Reservation Protocol (RSVP) for guaranteeing the bandwidth of multimedia data. What is guaranteed, however, is mainly just continuous data, that is, multimedia data. It is difficult to apply this bandwidth guaranteeing technology to the sporadic TCP data which accounts for most of the traffic on an IP network.

Further, there is also the differentiated service (Diffserv) technology for preferential control of individual packets. Even if this technology is used in a limited network bandwidth, however, the total amount of data which can be communicated naturally ends up being limited to the network bandwidth. Therefore, sometimes the quality of the data communications cannot be sufficiently secured.

Further, if there are other routes not being made much use of for data communications, those routes could be used as bypass routes. In this case, the bandwidth and other resources of the network could be utilized more efficiently. No such technology however has yet been established.

Summarizing the problems to be solved by the invention, various types of traffic, for example, multimedia traffic for audio or moving picture streams etc. and http traffic for transferring data and viewing web pages, is mixed on networks. In this case, the UDP is used for moving picture traffic such as video-on-demand services. Such traffic however consists of streams of packets continuing over a long period of time. Further, with the above http traffic using TCP, the data tends to be burst like and sporadic in nature with respect to time.

Further, in the same way as http traffic, looking at data transfer protocol using TCP, that is, ftp, ftp is continuous. Further, the time over which the continuous data is sustained differs according to the amount of data transferred. If transferring a file by ftp, during the transfer, the network becomes temporarily overloaded. If it is attempted to view a Web page in this overloaded state, the display of the Web page at the end system ends up becoming extremely slow.

Further, looking at the UDP, this UDP is used for large volume data streams such as for video-on-demand services. The UDP differs from the TCP, however. When there is discarded data, lost data, cyclic redundancy check (CRC) error packets, etc., there is no retransmission function for resending the data. Therefore, when such a UDP stream and TCP data conflict, parts of both data naturally are discarded. TCP however has a retransmission function, so when executing a TCP slow start algorithm, the TCP data ends up being robbed of bandwidth by the UDP data. Therefore, the capacity for transfer of TCP data ends up remarkably falling (the TCP slow start algorithm will be explained in more detail at the end referring to FIG. 30, FIG. 31 and FIG. 32).

Further, as explained above, if there are other routes not made much use of for data communications, it may be considered to use these routes as bypass routes. In this case, it becomes possible to make efficient use of the network as a whole. At the present, however, no practical technique has yet been established regarding the use of such bypass routes.

Due to the above, in the future, along with the diversification of traffic, the increase in multimedia data, and the further spread of IP-VPN services provided by carriers, there will be strong demands for development of traffic engineering maintaining qualities of transmission commensurate with the different types of traffic while enabling the transmission of data by the most suitable route at all times so as to ensure the efficient utilization of networks.

SUMMARY OF THE INVENTION

An object of the present invention is to provide a network system enabling data to be transmitted over the most suitable route in the network selected in accordance with the type of data so as to enable the quality of the data communications to be ensured and the network to be efficiently utilized.

Another object is to provide a network relay apparatus, network relay monitoring apparatus, and method of network operation for such a system.

To attain the first object, according to the present invention, there is provided a network system including at least one network relay apparatus provided with a discriminating means (13) for discriminating the type of data transmitted, a selecting means (14) for selecting the optimal route for each string of data in accordance with the discriminated type and destination, and a holding means (15) for holding the optimal routing information for each type of data and destination and sending received data toward the optimal route. Therefore, the quality of the data can be ensured and efficient use can be made of the network.

BRIEF DESCRIPTION OF THE DRAWINGS

These and other objects and features of the present invention will become clearer from the following description of the preferred embodiments given with reference to the attached drawings, wherein:

FIG. 1 is a view of the basic configuration of a network system according to the present invention;

FIG. 2 is a view of a specific example of a network system according to the present invention;

FIG. 3 is a view of an embodiment of a network relay apparatus according to the present invention;

FIGS. 4a and 4b are views for explaining the concept of a route selection condition setting unit 33 of FIG. 3;

FIG. 7 is a is a view of the content of a network topology database;

FIG. 8 is a chart illustrating an example of data held in a routing/bandwidth information database 45;

FIG. 9 is a view of an example of a bandwidth information/congestion information delivery packet;

FIG. 10 is a view showing the content of the bandwidth information database 43 in further detail;

FIG. 13 is a view illustrating an example of data held in the routing/bandwidth information database 45 to which the bandwidth information has been added;

FIG. 14 is a view schematically showing a setting function of the route selection condition setting unit 33;

FIG. 18 is a view illustrating a second example of the data held in the routing/bandwidth information database 45;

FIG. 19 is a view illustrating a third example of the data held in the routing/bandwidth information database 45;

FIG. 22 is a view of an example of a congestion state delivery packet;

FIG. 23 is a view illustrating an example of data held in the routing/bandwidth information database 45 to which the congestion information is added;

FIG. 24 is a view illustrating the concept of a setting function of the route selection condition setting unit 33;

DESCRIPTION OF THE PREFERRED EMBODIMENTS

Figure 5:
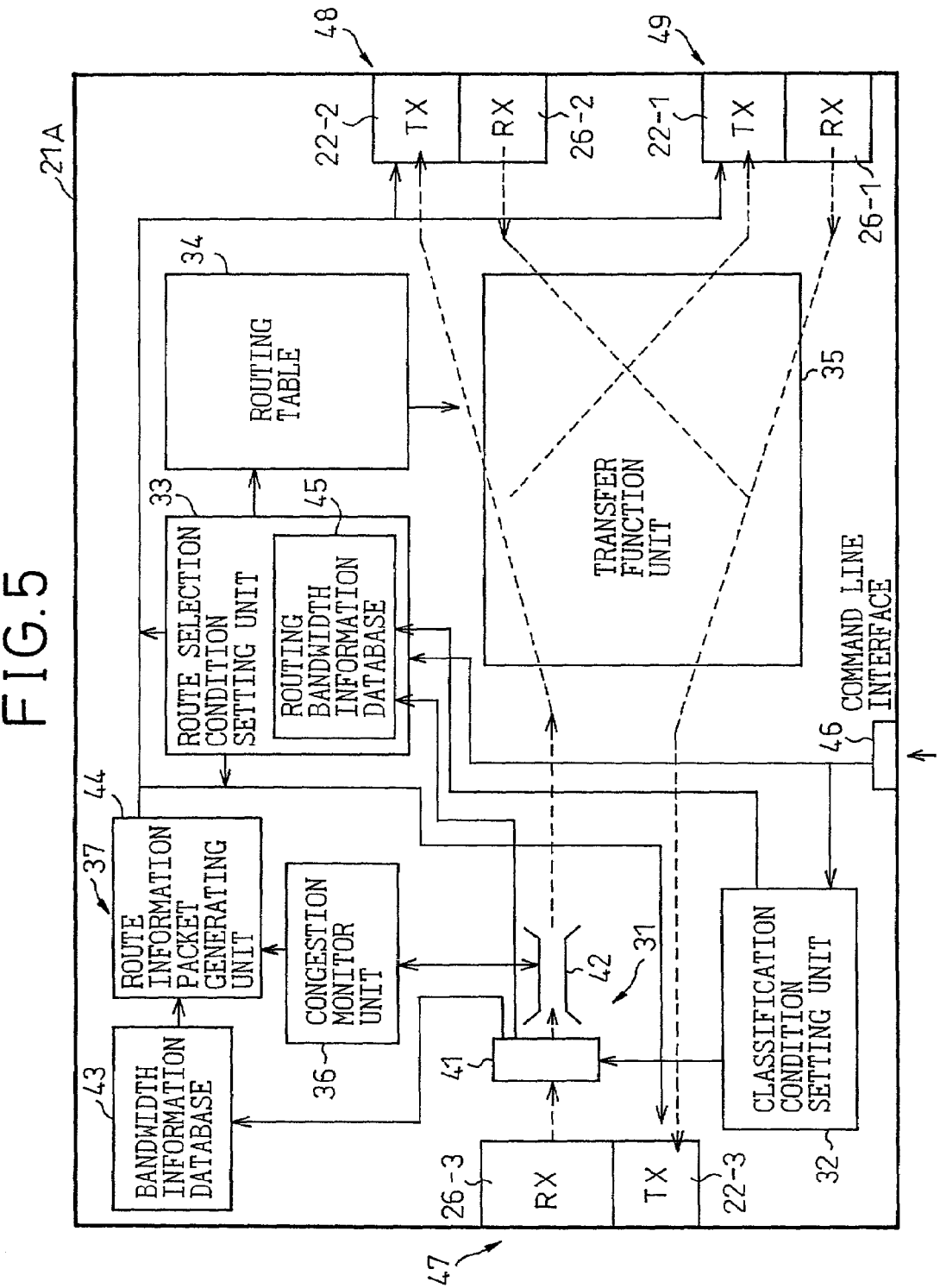
FIG. 5 is a view showing the network relay apparatus of FIG. 3 in more detail.

Preferred embodiments of the present invention will be described in detail below while referring to the attached figures.

FIG. 1 is a view of the basic configuration of the network system according to the present invention.

As shown in the figure, the network system 10 of the present invention has at least a network 11, a discriminating means 13, and a selecting means 14.

That is, it has a network 11 comprised of a plurality of paths 12 for transmission of data (shown as packets PKT), a discriminating means 13 for discriminating the type of data (PKT) transmitted over paths 12, and a selecting means 14 for selecting the optimal route of the paths for each data in accordance with the type discriminated for each data (PKT) and its destination based on bandwidth information Ib for each path 12 collected in advance.

Preferably, the network system 10 has a holding means 15 for holding routing information for the optimal paths for each type of data and destination selected by the selecting means 14 and forwards the received data toward the optimal route in accordance with the routing information in the holding means 15.

Further, the selecting means 14 further sequentially collects congestion information Ic of the paths 12 and selects the optimal route of the paths by referring to both the bandwidth information Ib and congestion information Ic.

Still further, the network 10 has a plurality of network relay apparatuses 21 mutually connected through the paths 12. Each network relay apparatus 21 has a notifying means 16 for notifying the congestion information Ic obtained by monitoring and bandwidth information Ib of the paths connected to it to other network relay apparatuses 21. All the network relay apparatuses 21 share the same congestion information Ic and bandwidth information Ib.

Using the configuration of FIG. 1, the present invention classifies the packets PKT received by a network relay apparatus in the network 11 (including the three means 13, 14, and 15 of FIG. 1) by the properties of the traffic or the type of the protocol etc. and forwards each group of classified packets PKT by a different suitable route of paths 12.

At this time, the network relay apparatus (13, 14, and 15) obtains a grasp of the configuration of the network 11, obtains a grasp of the bandwidth information Ib of the paths 12, the congestion information (Ic) at a certain time, and the trends in congestion, and uses this information and status to select the route matching the object or properties of the packets PKT and enable transmission of the packets via the selected route.

By selecting the optimal route at all times in this way, it is possible to efficiently transmit data in data communications, improve the quality of transmission, and effectively utilize network resources.

FIG. 2 is a view of a specific example of a network system according to the present invention. Note that throughout the drawings, the same components are given the same reference numerals or symbols.

The point to note in FIG. 2 is that the discriminating means 13, the selecting means 14, and the holding means 15 shown in FIG. 1 are constructed inside each of the plurality of network relay apparatuses 21 (21A, 21B . . . ). The present invention is not however limited to this. The means 13, 14, and 15 may also be constructed inside suitable apparatuses other than the network relay apparatuses 21 (see 60 in FIG. 27).

Referring to FIG. 2, part of the network forming the network system 10 is shown by reference numeral 11. This network 11 is comprised of a plurality of paths. In this figure, part of them is shown by reference numerals 12. In particular, the routes of the plurality of paths 12 from a subnetwork 23A to a subnetwork 23B are shown.

The plurality of network relay apparatuses 21 housing the means 13, 14, and 15 of FIG. 1 are arranged, as shown by 21A to 21E, on the plurality of paths 12. Note that the relay apparatuses 21 are for example routers or layer 3 switches.

The subnetworks 23 are connected as shown-by 23A to 23D under the control of these network relay apparatuses 21. Note that in this figure, in particular, a data transmitting host 24 in the subnetwork 23A and a data receiving host/server 25 in the subnetwork 23B are shown as specific examples. These host 24 and host/server 25 have the network relay apparatuses 21A and 21E connected to them.

The network relay apparatus 21A is further shown with the two transmitting ports 22 specifically while assigning reference numerals 22-1 and 22-2 thereto.

This figure shows an example where multimedia data Dm is transferred as shown by the thick solid arrow over the route of the paths 12 from the transmitting port 22-2, while http and spreadsheet data Dn is transferred as shown by the broken line arrow over the route of the paths 12 from the transmitting port 22-1.

These data Dm and Dn are selectively routed as explained above predicated on the transfer of bandwidth information Ib and congestion information Ic between the network relay apparatuses 21. The notifications for this transfer are shown by the two-directional arrows (Ib/Ic) between the network relay apparatuses 21.

This figure will now be explained in further detail.

First, it is assumed that data is routinely transferred from the network 23A to the network 23B. This data is assumed to include streaming multimedia communication including a large amount of data and extending over a long period of time and job media communication handling information sporadically occurring and relatively small in amount of data, but important like viewing of information or spreadsheet data.

In an ordinary IP network, the shortest route, that is, the route of the network relay apparatuses 21A→21B→21E, is used for the communication between the subnetworks 23A and 23B. That is, the traffic for all media communications is mixed on the same route. In this case, pressured by the multimedia communications handling the data streams, that is, multimedia data, the job media communications handling the http data for viewing information or the spreadsheet data is obstructed and the problem arises of the response in communication between the two end systems so important to work becoming slower.

Here, assume that there is a route of the network relay apparatuses 21A→21C→21D→21E not the shortest route, but having a large network bandwidth. If so, transmitting the multimedia data by this large bandwidth route (route ACDE of the network relay apparatuses 21) would enable realization of a high quality reproduction of moving pictures or audio in the end systems.

Therefore, if it were possible to transmit the multimedia data over the route ACDE of the network relay apparatuses 21 and transfer the http data or spreadsheet data over the route ABE of the network relay apparatuses 21, the efficiency of the network 11 could be improved and a better response could be obtained for both data.

FIG. 3 is a view of an embodiment of a network relay apparatus according to the present invention. Note that the network relay apparatuses 21A to 21E shown in FIG. 2 have the same configurations, so only one of these, that is, 21A, is shown in FIG. 3.

The network relay apparatus 21A shown in the figure, as basically shown in FIG. 2, is comprised of a discriminating means 13 for discriminating the type of data transferred over a plurality of paths 12 comprising a network 11, a selecting means 14 for selecting the optimal route of the paths for each data (route of Dm or route of Dn in FIG. 2) in accordance with the type discriminated for each data and its destination based on bandwidth information Ib for each path 12 collected in advance, and a holding means 15 for holding optimal path routing information Ir for each type of data and destination selected by the selecting means 14. The received data is forwarded toward the optimal route of paths in accordance with the routing information Ir in the holding means 15.

The selecting means 14 sequentially collects congestion information Ic for each path 12 and selects the optimal route of the paths for each data by referring to both the bandwidth information Ib and congestion information Ic.

Specifically, the discriminating means 13 is comprised of a packet discriminating means 31 for discriminating the type of the data received from the paths 12 and classifying and separating the packets and a classification condition setting unit 32 for setting the classification conditions for the data serving as the reference for discrimination.

More specifically, the selecting means 14 is comprised of a route selection condition setting unit 33 for setting a condition for selecting the optimal route of paths for transfer of each data separated in accordance with a data classification condition serving as a reference for discrimination of the type of data based on bandwidth information Ib and congestion information Ic obtained from other network relay apparatuses (21B to 21E) and makes the holding means 15 hold the optimal route (Ir) selected in accordance with the route selection condition setting unit 33.

The holding means 15 is comprised of a known routing table 34.

The data (packets PKT) passing through a packet discrimination unit 31 are input to a switch or other transfer function unit 35 where the data is switched in accordance with the routing information Ir from the routing table 34 and transferred from the transmitting port (22) to the path 12 toward its destination.

Here, looking at the route selection condition setting unit 33, the setting unit 33 receives the congestion information Ic from other network relay apparatuses (21B to 21E) periodically or whenever congestion occurs and reflects this on the route selection.

Therefore, each of the other network relay apparatuses (21B to 21E) also has a congestion monitor unit exactly the same as a congestion monitor unit 36 shown in FIG. 3 and a bandwidth information/congestion information packet generating unit exactly the same as a bandwidth information/congestion information packet generating unit 37. That is, explaining this using the network relay apparatus 21A of FIG. 3 as a representative case, the apparatus 21A is provided inside it with a congestion monitor unit 36 for monitoring the states of congestion of data received at the receiving ports (26-1, 26-2, and 26-3) from the paths 21 and a bandwidth information/congestion information packet generating unit 37 for generating a packet forwarding the congestion information Ic detected by this monitoring and the bandwidth information Ib showing the bandwidth of the paths 12 connected to itself (21A) toward the other network relay apparatuses (21B to 21E).

An example of the series of operations of a network relay apparatus 21A configured in this way (same for other network relay apparatuses 21B to 21E) will be explained next.

Note that in the embodiments discussed below, reference will be made to the case of use of the open shortest path first (OSPF) networking routing protocol used in corporate networks and relatively large networks of ISPs (Internet Service Providers) and carriers and enabling each network relay apparatus 21 to obtain a grasp of the topology of the overall network 11. Of course, the present invention can also be applied to the case of use of other routing information protocol (RIP) or other routing protocol.

First, the packet discrimination unit 31 of the network relay apparatus 21A having the configuration shown in FIG. 3 discriminates and classifies the data (packets PKT) flowing from the subnetwork 23A. For example, UDP is used for multimedia data, while TCP is used for guaranteeing the reliability of the data transmission for http data or spreadsheet data.

Therefore, the classification condition setting unit 32 is set with the TCP and UDP as the classification conditions and discriminates the TCP data and UDP data to separate the data. Further, the conditions in-the route selection condition setting unit 33 are set so that multimedia data (UDP) is transmitted over the route of 21A→21C→21D→21E and the TCP data is transmitted over the route of 21A→21B→21E. Further, the conditions are input to the routing table 34 to update the routing information Ir.

To realize this, it is sufficient to prepare and use output interfaces (TX) of the network relay apparatus 21A and mapping information of the types of data.

Further, information on which network is the shortest path or on the bandwidth for each path or congestion information for each path 12 is necessary when selecting the route. The route is determined dynamically referring to the number of hops (number of network relay apparatuses 21 passed through) for each route referring to the routing table 34, the results of detection of congestion at the congestion monitor unit 36, and the bandwidth information Ib for each path 12.

This information (Ib, Ic) is transferred among the network relay apparatuses 21 and stored and set in the route selection condition setting units 33. By referring to the routing table 34, a route with a broad bandwidth or a route with no congestion is selected and the data is transmitted to the optimal route for each property of the traffic.

FIGS. 4a and 4b are views for explaining the concept of the route selection condition setting unit 33 of FIG. 3.

FIG. 4a shows the concept of the route selection condition setting unit 33 when not exhibiting the function of the present invention or when no conditions are set, while FIG. 4b shows the concept of the route selection condition setting unit 33 when exhibiting the function of the present invention and statically or dynamically set with conditions.

Using the concept of FIG. 4b, it is possible to transmit data for each type of traffic, that is, for each type of data, while selecting the optimal route commensurate with that type.

Further, when detecting a congested state somewhere in the route ABE (21A→21B→21E) of FIG. 2, it is possible to reflect that information (Ic) back in the route selection condition setting unit 33, transmit the most important http data and spreadsheet data via the route ACDE (21A→21C→21D→21E) of FIG. 2, and transmit the not important multimedia data via the route ABE.

According to the example of FIG. 4b, it is shown that, in the data transferred from the subnetwork 23A to the subnetwork 23B in FIG. 2, the TCP data should be transmitted to the router 21B side of the 1.5M bandwidth path from the transmitting port 22-1, while the UDP data should be transmitted to the router 21C side of the 3M bandwidth path from the transmitting port 22-2.

In this way, by transmitting data of different traffic properties by optimal routes commensurate with the same, it is possible to improve the response of important data such as information viewing http data or spreadsheet data and smoothly reproduce data at the end systems for multimedia data.

Further, by using a plurality of routes in a load sharing manner, efficient utilization of the network 11 as a whole becomes possible.

Further, as explained later with reference to FIG. 28 and FIG. 29, the present invention can be applied to for example the virtual private network (VPN) service of an ISP carrier where a user charged with a high rate is provided with low delay/low packet loss rate service by transmission according to the type of traffic (type of data) using a plurality of routes to thereby provide a quasi load sharing service, while a user charged with an ordinary rate is provided with service using ordinary routes. The invention can be applied to various services by providing such full service menus.

FIG. 5 is a view showing the network relay apparatus of FIG. 3 in further detail.

In the figure, components the same as the components 13, 14, 15, 31, 32, 33, 34, 35, 36, 37, 22-1 to 22-3, and 26-1 to 26-3 are shown with the same reference numerals.

Therefore, the components newly shown in FIG. 5 are a packet judging unit 41, an incoming queue 42, a bandwidth information database 43, a route information packet generating unit 44, a routing/bandwidth information database 45, a command line interface 46, and interfaces 47, 48, and 49.

The packet judging unit 41 and incoming queue 42 comprise the above-mentioned packet discrimination unit 31. The packets from the interface 47 are judged as to type by the packet judging unit 41 in accordance with the classification conditions (at least the TCP or UDP) at the classification condition setting unit 32.

When the packet judging unit 41 judges that a received packet is a bandwidth information delivery packet from another network relay apparatus, the packet is transmitted to the bandwidth information database 43 side without being entered into the incoming queue 42. Further, the database 43 stores bandwidth information delivered by the packet (see FIG. 10). The database 43 also stores bandwidth information which the network relay apparatus 21A itself should deliver to other network relay apparatuses.

Further, when the packet judging unit 41 judges that a received packet is a congestion information delivery packet from another network relay apparatus, the packet is transmitted to the routing/bandwidth information database 45 side in the route selection condition setting unit 33 without being entered into the incoming queue 42 and the congestion information delivered by the packet is stored in the database 45.

Note that the original role of the routing/bandwidth information database 45 is to store the routes which may be taken from any one subnetwork (23) to any other subnetwork (23) and/or the bandwidth information of the routes (see FIG. 13) and provide this information to the route selection condition setting unit 33. Note that the conditions at the condition setting unit 33 and the classification condition setting unit 32 are suitably set by the user. Therefore, the command line interface 46 is provided.

Further, when the packet judging unit 41 judges that a received packet is a transfer packet of inherent data (multimedia data Dm or spreadsheet data Dn), the packet is entered into the incoming queue 42.

The data output from the incoming queue 42 is transmitted from the transfer function unit 35 to the corresponding interface (48/49) and then transferred to the next network relay apparatus under the routing control of the routing table 34.

The crowding of packets packed one after the other in the incoming queue 42 (see FIG. 20 and FIG. 21) is detected by the congestion monitor unit 36. The state of congestion detected here is transmitted to another network relay apparatus as the above-mentioned congestion information delivery packet. The packet is generated by the routing information packet generating unit 44. This packet generating unit 44 also generates a bandwidth information delivery packet for transmitting the bandwidth information stored in the bandwidth information database 43 to another network relay apparatus.

Each of these delivery packets is transmitted directly from the interfaces (TX) 47, 48, and 49 to other network relay apparatuses without going through the transfer function unit 35.

Next, the configuration and operation of FIG. 5 will be explained in detail with reference to an actual example of a type of network.

Figure 6:
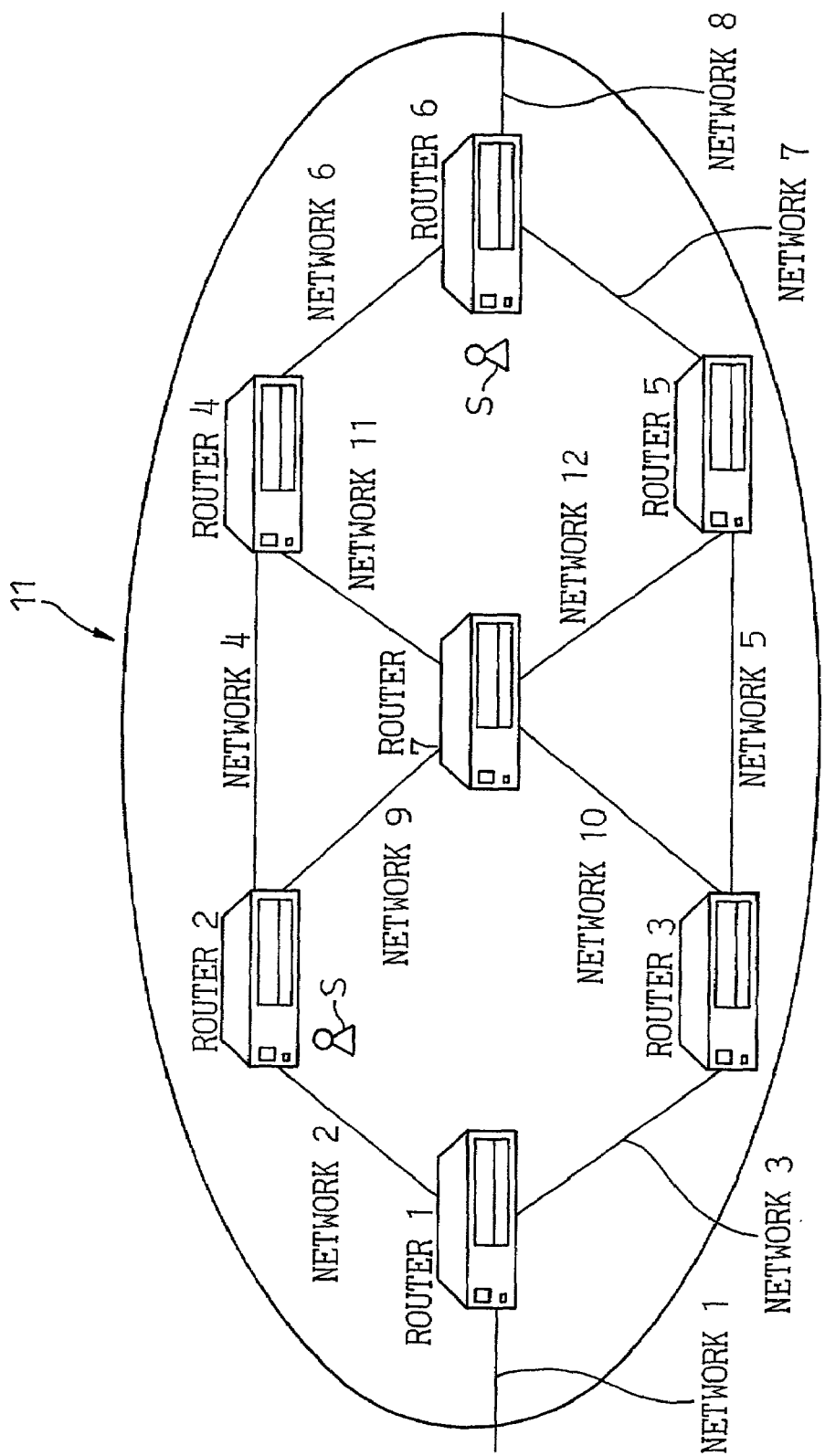
FIG. 6 is a view of an example of a type of network to which the present invention is applied.

FIG. 6 is a view of an example of a type of network to which the present invention is applied.

Note that the type of network in the figure is a further expansion of the type of FIG. 2 and covers the Internet, intranets, and ISP networks.

In the figure, "network 1", "network 2", . . . are IDs for discriminating the subnetworks. In the figure, there are 12 subnetworks. Further, "router 1", "router 2", . . . are IDs for discriminating the network relay apparatuses 21. In the figure, there are six network relay apparatuses (hereinafter also called "routers").

It is preferable in terms of application of the present invention that these routers (21) originally hold topology databases of the network. Note that if the previously explained OSPF is used as the routing protocol, each router can easily hold such a topology database. This is shown in FIG. 7.

FIG. 7 is a view of the content of a topology database of a network.

The left end and top end of the topology database 51 show the router IDs and the subnetwork IDs shown in FIG. 6, respectively.

For example, taking note of the router 1 of FIG. 6, the router 1 is connected to the networks 1, 2, and 3, so circle marks are provided in the corresponding boxes in FIG. 7. Looking at the router 7 of FIG. 6, the router 7 is connected to the networks 9, 10, 11, and 12, so circle marks are provided in the corresponding boxes in FIG. 7.

Using this topology database 51, it is possible to easily obtain a grasp of which router (network relay apparatus) is connected to which networks. Therefore, it is possible to easily prepare the routing table 44 of FIG. 3 and FIG. 5 from this topology database 51.

If using this topology database 51, the route selection condition setting unit 33 (FIG. 5) can recognize all types of routes from any subnetwork to another other subnetwork and can store the recognized routes in its routing/bandwidth information database 45 (FIG. 5). One example is shown in FIG. 8.

FIG. 8 is a view illustrating an example of the data held in the routing/bandwidth information database 45.

In this example, all types of routes of transfer of data from the network 1 to the network 7 of FIG. 6 are shown. There are 10 routes in all. Each is assigned a route number, that is, Route No. 1 to Route No. 10 shown at the left in FIG. 8.

Looking at for example Route No. 6 among these, Route No. 6 passes through the following route from the network 1 to the network 7 of FIG. 6.

Router 1→Router 3→Router 7→Router 5→Router 6. There are five stages of routers (see top right of FIG. 8) at this time. These stages of routers are called passing through "hops".

The information of FIG. 8 is recognized by all routers and held in each.

In FIG. 8, only the specific route for each route number (router 1→router 2→router 7 . . . etc.) and the number of stages of routers are shown as the content of the routing/bandwidth information database 45, but in working the present invention, it is necessary for each router to further acquire the bandwidth information Ib or congestion information Ic of every path and to store and hold this information in the routing/bandwidth information database 45.

The information Ib and Ic are notified among routers using the above bandwidth information/congestion information delivery packets. This will be shown in the figure.

FIG. 9 is a view of an example of a bandwidth information/congestion information packet.

This example uses an Ethernet frame 52. A field for the present invention is defined in the frame. The field is shown enlarged at the bottom as the congestion information field 53.

The congestion information field 53 includes areas "a", "b", and "c".

The area "a" is the area for showing whether to notify or update bandwidth information. Two bits ("10" or "11") are prepared for this.

The area "b" is for writing the network address of the entity, that is, subnetwork, transmitting the bandwidth information to another router.

The area "c" is for writing the content of the bandwidth information, that is, the bandwidth. The information of the bandwidth is stored in the bandwidth information database 43 (FIG. 5).

The Ethernet frame 52 includes, in addition to the field 53, an ordinary MAC header, IP header, and frame check sequence (FCS).

The Ethernet frame 52 is assembled as a packet by the routing information packet generating unit 44 (FIG. 5) and transmitted from the output (TX) sides of the interfaces 47, 48, and 49 (FIG. 5) to respective paths 12.

In this way, the information of the bandwidth of the area "c" is stored in the bandwidth information database 43. This will be explained with reference to FIG. 10.

FIG. 10 shows the content of the bandwidth information database 43 using a specific example.

The database 43 shows the bandwidths for all of the subnetworks shown in FIG. 6 (network IDs network 1 and network 2 to network 12). For example, the network 6 has a bandwidth of 4.5 Mbit, while the network 10 has a bandwidth of 3 Mbit. The bandwidth data can be obtained by transfer of the delivery packets (52) shown in FIG. 9 between routers.

Each router (21) has to discriminate whether a received packet is a delivery packet (52) or a data packet carrying original multimedia data or job media data. To enable this discrimination, for example, it is sufficient to use a known IPv4 header and IPv6 header shown in FIG. 11 and FIG. 12.

Figure 11:
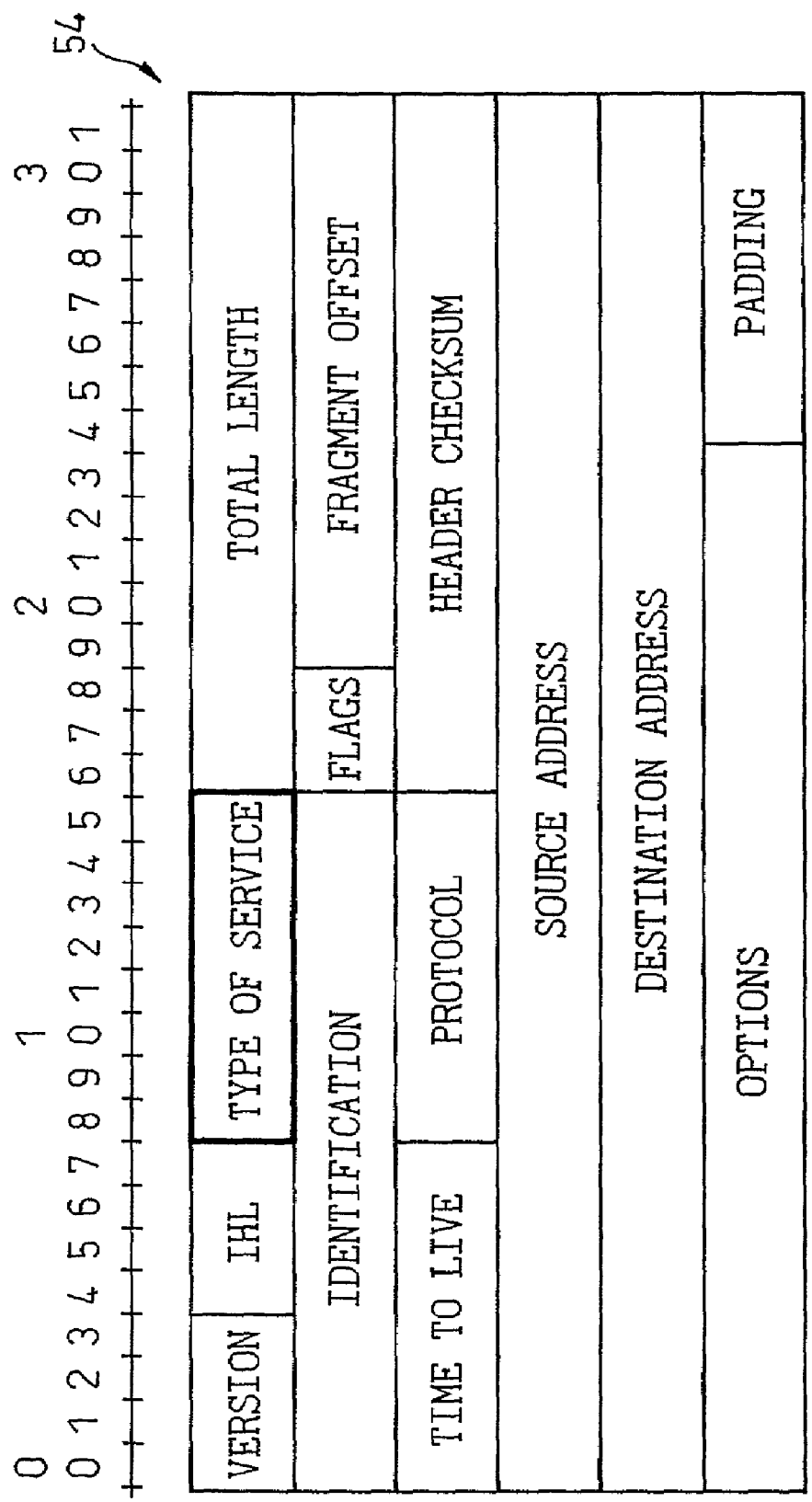
FIG. 11 is a view of the format of an IPv4 header.
Figure 12:
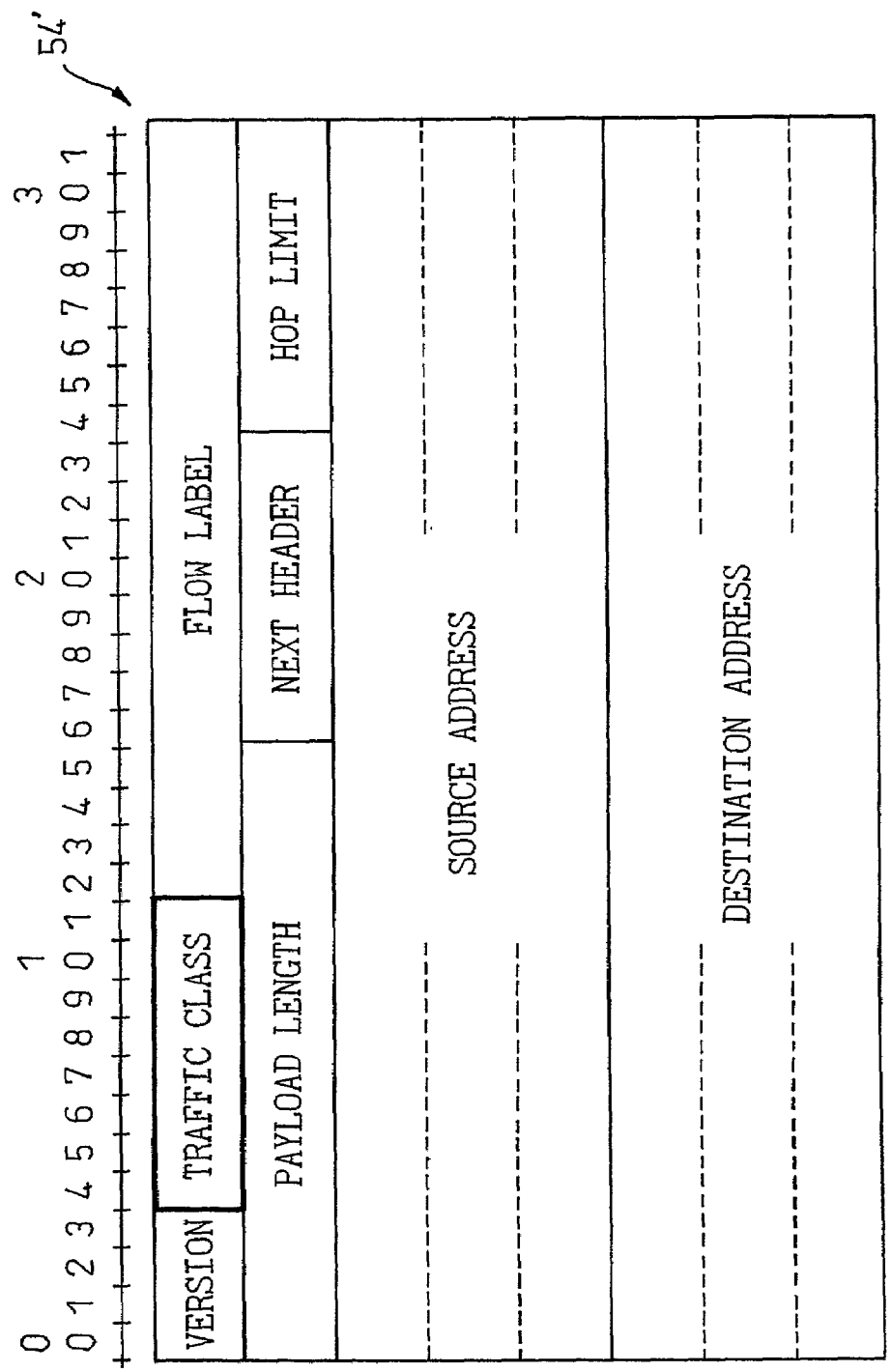
FIG. 12 is a view of the format of an IPv6 header.

FIG. 11 is a view of the format of an IPv4 header. FIG. 12 is a view of the format of an IPv6 header. Both formats are known from requests for comments (RFC) 791. For example, in the IPv4 header 54 shown in FIG. 11 and the IPv6 header 54' shown in FIG. 12, specific values are set in the lower 2 bits of the currently unused "type of service" field of IPv4 header and unused "traffic class" field of IPv6 header. Alternatively, in the case of the IPv4 header 54, it is sufficient to set a specific value other than the value currently used for the "Protocol" field.

Here, referring again to FIG. 5, the packet judging unit 41 shown in the figure judges the type of the packet received from the receiving port 26-3 by viewing the aforesaid lower 2 bits. When it is determined that the received packet is a delivery packet (52), this is sent to the route selection condition setting unit 33.

The "protocol" field in the IPv4 header 54 of FIG. 11 is the ID number showing what the received packet (IP packet) is, in other words, what is being carried. For example, the Internet control message protocol (ICMP) is set as "2", while the transmission control protocol (TCP) is set as "6". These values are described in the 1700 and other numbers in the request for comments (RFC) of a document issued by the standardization organization Of the Internet technology.

The IP packet is successively delivered by the routers (network relay apparatuses) over the paths 12 (hop by hop) whereby the bandwidth information of the routes in the network 11 is delivered to the routers in the network 11. That is, a router next receiving a delivery packet transmitted from a certain interface (47, 48, 49) transfers the delivery packet from all remaining interfaces other than the received interface.

If receiving a delivery packet of the same content at an interface among these interfaces, it learns that routers beyond that interface already have bandwidth/congestion information of the same content, so does not transfer the delivery packet to that routers.

When a router receiving the above delivery packet confirms, at the packet judging unit 41 of FIG. 5, that it is a delivery packet, it sends the packet to the bandwidth information database 43 without entering the packet into the incoming queue 42. Therefore, the bandwidth and the related routing information are reflected into the database 43 and the database 43 of FIG. 10 is completed.

If routers exchange information of the bandwidth information database 43, all routers can obtain information of bandwidths of the routes of the same content as shown in FIG. 10.

By the above transfer of delivery packets among routers, it is possible to obtain a database 45 having contents of the information of the database 45 shown in FIG. 8 plus bandwidth information for each route number. An example is shown in FIG. 13.

FIG. 13 is a view illustrating one example of data held in the routing/bandwidth information database 45 added with bandwidth information.

FIG. 13 should be viewed in exactly the same way as FIG. 8 explained above, but in FIG. 13, a column of bandwidth information for each route number is added to FIG. 8. In FIG. 13, information based on the minimum bandwidth is shown as the bandwidth information. For example, it is shown that in the route of the Route No. 1, a bandwidth of at least 1 Mbit can be secured.

Therefore, for transfer of multimedia data, a route of a broad bandwidth (and small number of stages of routers) should be selected, so the route selection condition setting unit 33 of FIG. 5 is set to select the route of 2 Mbit of Route No. 3. Further, this setting can be reflected into the routing table 34.

The bandwidth information was determined based on the minimum bandwidth in FIG. 13, but it is also possible to determine it in various other ways according to the network status. This will be explained in general below.

The bandwidth information which the selecting means 14 refers to for selecting the optimal route of paths 12 can be defined as one parameter from among:

(a) the minimum value in the bandwidths of the plurality of paths on a route, that is, the minimum bandwidth, (b) the average value of the bandwidths of a string of paths 12 along a route, that is, the average bandwidth (explained later), and (c) the maximum value of the bandwidths of a string of paths 12 along a route, that is, the maximum bandwidth (explained later).

The route selection condition setting unit 33 (FIG. 5) having the above routing/bandwidth information database

45 generates routing data to be reflected in the routing table 34. An example is shown in FIG. 14.

FIG. 14 is a view showing the concept of a setting function of the route selection condition setting unit 33.

One topic of the present invention is how to cause the optimal routes to be used when two types of traffic (TCP and UDP) are transmitted to the network 7 from the network 1 of FIG. 6.

By the processing up to here, the router 1 of FIG. 6 prepares information at the route selection condition setting unit 33 of FIG. 5 in accordance with the content of FIG. 14 so as to transmit the http or spreadsheet data using the TCP via the shortest route, that is, the route of the Route No. 1 of FIG. 8, while transmit the multimedia data and other data using the UDP by the route of the Route No. 2.

Referring to FIG. 14, first, the subnetwork of the destination is the network 7 according to the above example (FIG. 6). Further, the two types of traffic ("type of transmitting data") include TCP data and include UDP data and other data (shown by asterisk).

The condition which a route for transmission of this data should have is the condition of (d) of the figure for the TCP and the condition of (e) of the figure for UDP and *.

The minimum bandwidth which should be allotted is 2 Mbit for the TCP and 1 Mbit for the UDP and *.

Therefore, the route used is set by the setting unit 33 as the route of Route No. 3 (FIG. 13) for the TCP and the route of Route No. 1 (FIG. 13) for the UDP and * referring to the database 45 of FIG. 13. The settings are immediately reflected into the routing table 34 (FIG. 5) on the one hand, while are notified to all routers by the route selection condition delivery packets on the other hand, whereby all routers share the same content (above settings). An example of a packet is shown in FIG. 15.

Figure 15:
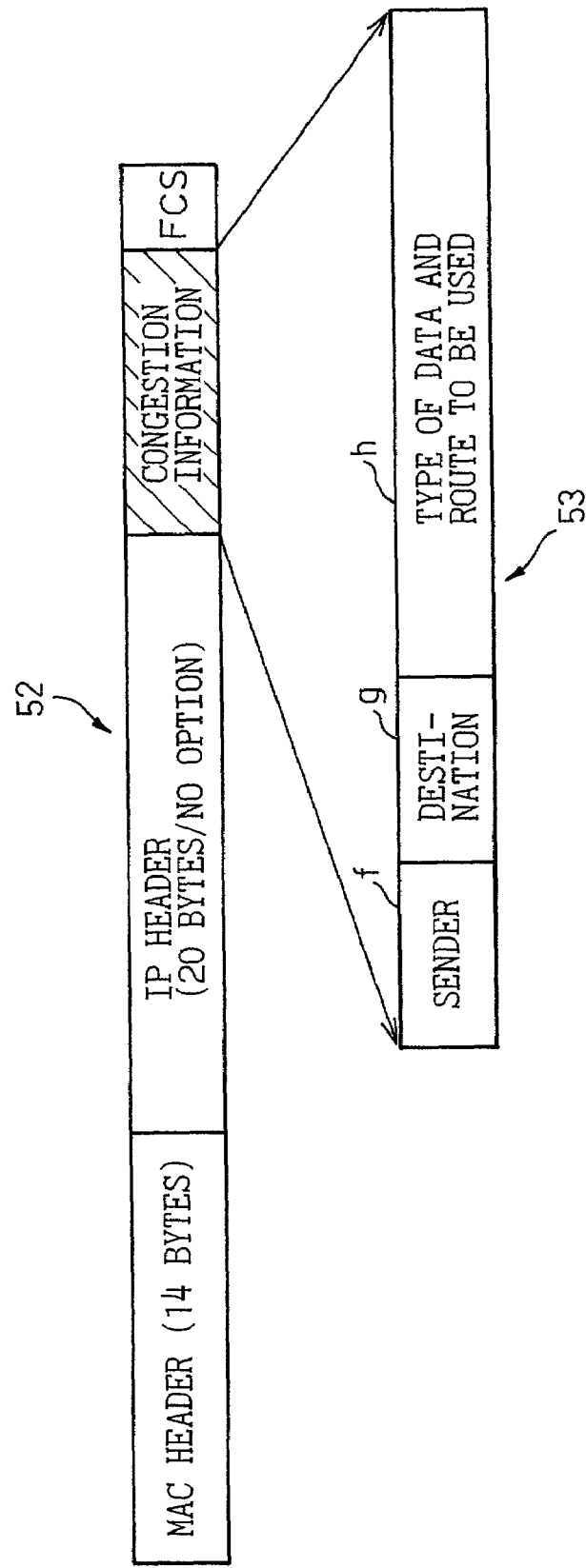
FIG. 15 is a view of an example of a route selection condition delivery packet.

FIG. 15 is a view of an example of a route selection condition delivery packet.

The packet of FIG. 15 is the same in data structure as the packet shown in FIG. 9. It is comprised of the Ethernet frame 52 and includes a congestion information field 53 inside the frame.

The difference from FIG. 9 is in the content of the information contained in the field 53. In accordance with the example of FIG. 14, the network address of the sender network 1 is written in the area "f", the network address of the destination network 7 is written in the area "g", and the TCP, UDP, *, and Route Nos. 3 and 1 are written in the area "h".

These areas "f", "g", and "h" are written in by the route selection condition setting unit 33 (FIG. 5), but the Ethernet frame 52 itself is generated by the route information packet generating unit 44 (FIG. 5).

Therefore, the Ethernet frame 52 of FIG. 15 is delivered to all routers from the interfaces (TX) 47, 48, and 49, whereby all routers share the content of the areas "f", "g", and "h" (at the databases 43 and 45).

Therefore, looking at the network 11 (FIG. 1) as a whole, the optimal route is selected for each type of data, and the multimedia data or job media data etc. is transferred to the target destination subnetwork. This situation is shown in FIG. 16.

Figure 16:
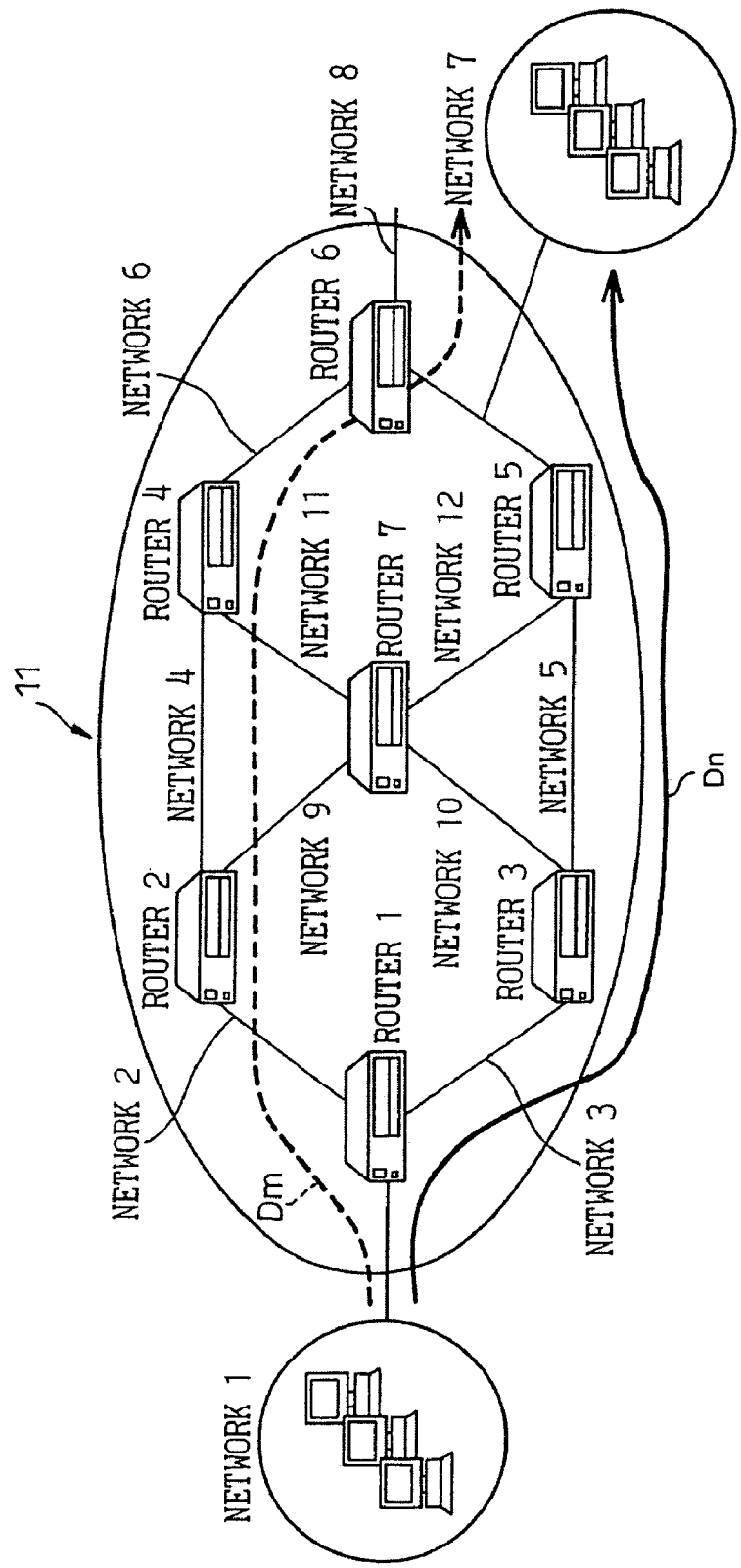
FIG. 16 is a view of the state of selection of the optimal route for each type of data based on the present invention.

FIG. 16 is a view of the situation when the optimal route is selected for each type of data based on the present invention. This FIG. 16 corresponds to FIG. 2 superposed over FIG. 6.

As explained above, by delivering, using the route selection condition data packet shown in FIG. 15, information on the sender and destination, the type of data, and the route to be used successively to the routers (network relay apparatuses), information on which route should be used to transmit data for each type of data is delivered.

By reflecting this information into the routing table 34 and the transfer function unit 35, as shown in FIG. 16, each router can transmit multimedia data Dm requiring a relatively large bandwidth and spreadsheet data or http data or other job media data Dn for which bandwidth is not required, but reliable communication is sought, over different routes from the same sender.

With ordinary routing, the optimal route for all data (Dm and Dn) is the Route No. 1 which is the shortest route and does not have sufficient bandwidth, so the communication of the multimedia data Dm has an adverse effect on the communication of the important spreadsheet data (Dn). According to the system of the present invention, however, the two data (Dm and Dn) are separated so as to eliminate interference between the traffic and enable effective use of the network 11 as a whole.

The effect of the present invention is remarkable under the above-mentioned OSPF, but can also be exhibited under the previously mentioned RIP environment as well.

The network 11 using the RIP as the routing protocol is a relatively small network. Further, when the RIP is used, each network relay apparatus (router) does not hold network topology information of which subnetwork 23 is connected to which network relay apparatus (router), unlike OSPF. It only obtains, under the RIP, a grasp of the address of the next network relay apparatus (router) when transferring a packet (routing).

Even in the case of such an RIP environment, however, it is sufficient for each network relay apparatus (router) to transmit information on which subnetwork it is connected to and for all network relay apparatuses to obtain a grasp of the topology. For this, it is sufficient to use the packet of FIG. 17.

Figure 17:
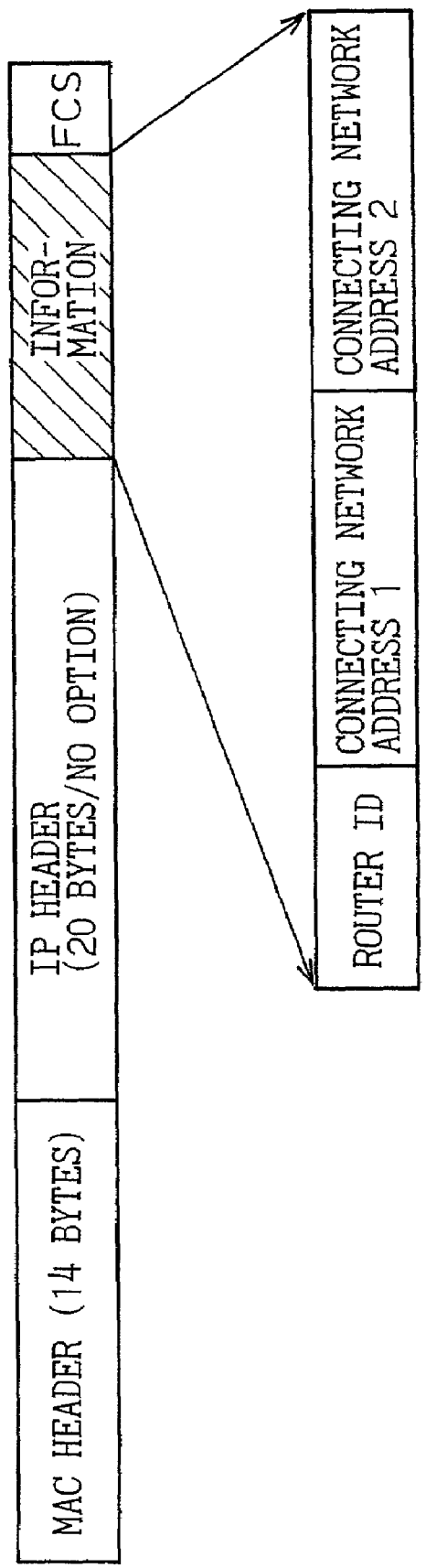
FIG. 17 is a view of an example of a packet frame used for adapting the present invention to an RIP environment.

FIG. 17 is a view of an example of the packet frame used for adapting the present invention to an RIP environment. This is a topology exchange frame.

Note that this figure should be viewed in exactly the same way as FIG. 9 and FIG. 15. Eventually, the routing information of FIG. 8 is shared by all routers.

That is, it is sufficient to use a broadcast information packet including a router ID for identifying a router (network relay apparatus) and network address connected to.

AS the router ID illustrated, it is sufficient to use a random unambiguous number. Due to this, it is possible to give a topology database the same as FIG. 7, possible to prepare a routing/bandwidth database 45 shown in FIG. 13 by exchanging the bandwidth information, and possible to realize dynamic selection of the optimal route in the same way as in an OSPF environment.

Here, we will return to the most suitable environment for the present invention, that is, the OSPF environment, and continue with the explanation.

It was already explained that it is possible to define the bandwidth information used for selecting the optimal route of paths 12 as one parameter from among:

(a) the minimum value in the bandwidths of the plurality of paths 12 on a route, that is, the minimum bandwidth, (b) the average value of the bandwidths of a string of paths 12 along a route, that is, the average bandwidth, and (c) the maximum value of the bandwidths of a string of paths 12 along a route, that is, the maximum bandwidth. Among these, (a) was already shown in FIG. 13, so (b) and (c) will be explained.

It is also possible to use as a parameter the average bandwidth of the route when transmitting a plurality of traffic (data) by different routes in accordance with the bandwidth information. An example will be shown in FIG. 18.

FIG. 18 is a view illustrating a second example of the data held in the routing/bandwidth information database 45. In this figure, different from FIG. 13, the average bandwidth is shown at the top right row.

That is, the average bandwidth is added as bandwidth information to the routing/bandwidth information database 45.

In the example of FIG. 18, it is learned that the average bandwidth of the Route No. 10 is large. When transmitting spreadsheet data or other data Dn by the shortest route Route No. 1, a portion of the network 3 becomes a common transmission line, so the route with the large average bandwidth in the routes not including the networks 3 and 5 becomes the route of Route No. 4. Therefore, the condition of "the route with the largest average bandwidth among the routes where there is no portion overlapping the TCP data transmission line" is added to the route selection condition setting unit 33. Alternatively, if such route calculating processing is added, it is possible to transmit the multimedia data Dm by the route 4.

Further, it may be considered to use the route, as the standard, including the maximum bandwidth among the routes. This example is shown in FIG. 19.

FIG. 19 is a view illustrating a third example of data held in the routing/bandwidth information database 45. That is, the largest bandwidth of the routes is added as information to the routing/bandwidth database 45.

In the example of FIG. 19, the route of Route No. 2 has a maximum bandwidth of 5 Mbit of the network 9 (see FIG. 10), but simultaneously includes a route of 1 Mbit of the network 12 (FIG. 10), so is not suitable for transmission of multimedia data Dm.

In this case, it is sufficient to prepare a route selection condition setting unit 33 by combining the minimum bandwidth information of FIG. 13 together.

For example, since the minimum bandwidth of the route of Route No. 3 is 2 Mbit and the maximum bandwidth is 4.5 M, multimedia data Dm with a continuous large amount of data should be transmitted over the route "3". Thus, a method of selection of the route by combining various types of bandwidths in this way may also be used.

There are other parameters for the bandwidth information besides the above-mentioned minimum bandwidth, average bandwidth, and maximum bandwidth.

For example, the selecting means 14 may also select the optimal route of paths for each data by referring to information on the number of stages of routers (number of passing through hops) unique to each route 12 in addition to the bandwidth information and the congestion information.

That is, it is effective to further add the number of hops, that is, how many routers (network relay apparatuses) are passed through, to the parameters when selecting a route.

For example, assuming use of the minimum bandwidth as the parameter and the transmission of spreadsheet data, multimedia data, and http data by different routes, from FIG. 13, it may be considered to transmit the multimedia data by the route "3" with the largest minimum bandwidth and the spreadsheet data by the route "1" and to finally transmit the http data by the route "2" with the number of hops next smaller than the above two routes. By adding the number of hops to the parameters in this way, i.e. adding the condition of the route with the relatively short distance, the routes may be selected more optimally.

Above, the explanation was given of an embodiment of selection of routes for each type of data by the bandwidth information of the network. Next, an explanation of the already mentioned congestion information will be added.

Another important thing at the time of route selection is the state of congestion of the network. Even if the bandwidth is large or data is transmitted over a different route for each traffic, a route where congestion frequently occurs is not suitable for transmission of for example spreadsheet data (Dn).

Further, even when transmitting multimedia data (Dm), packet discards etc. may occur and thus reproduction of a moving picture or audio may be interrupted at the end system.

Therefore, it is necessary to select the route by taking congestion information into account as well as bandwidth information. This will be explained below.

Figure 20:
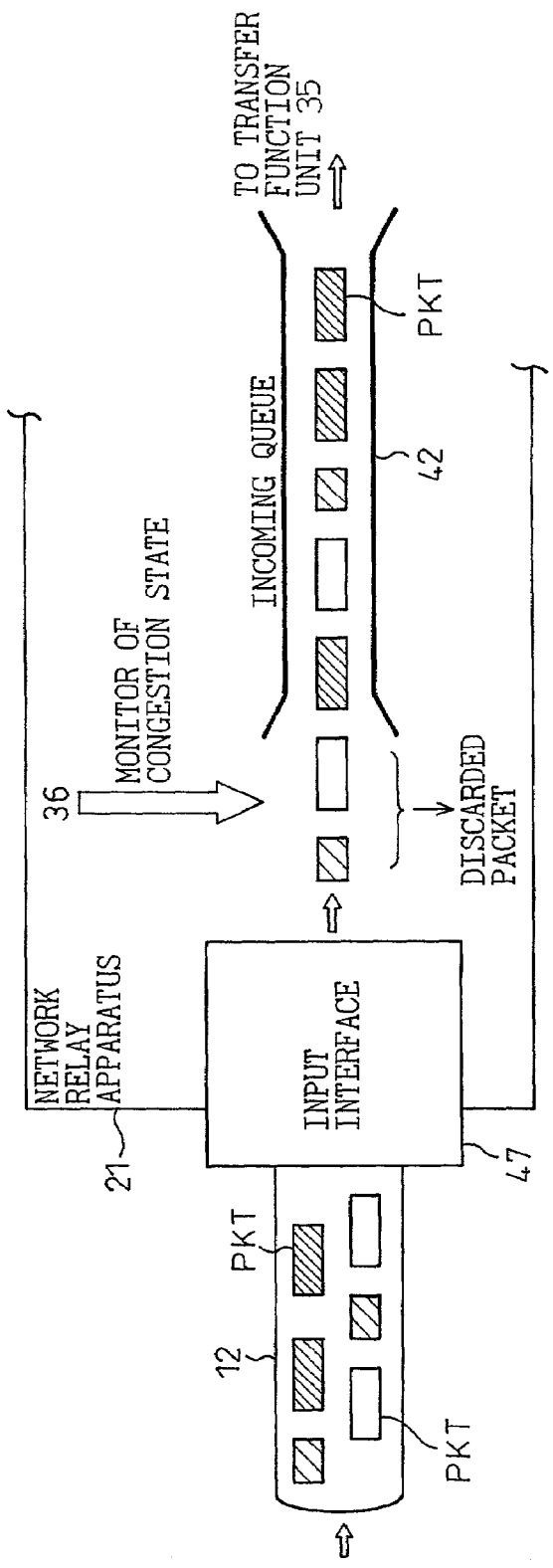
FIG. 20 is a view of a first mode of monitoring the state of congestion.

FIG. 20 is a view of a first mode of monitoring the state of congestion, while

Figure 21:
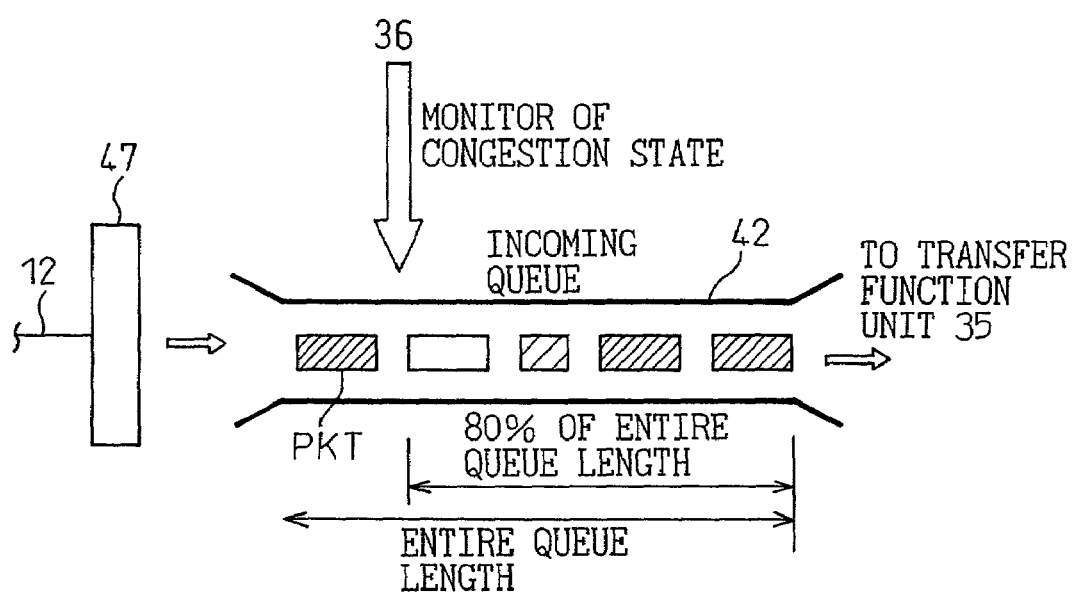
FIG. 21 is a view of a second mode of monitoring the state of congestion.

FIG. 21 is a view of a second mode of monitoring the state of congestion.

These figures show enlarged the portions of the input side interface 47 and incoming queue 42 shown at the left end in FIG. 5. The state of congestion is monitored by a nearby congestion monitor unit 36. First, each network relay apparatus (router) 21 monitors the state of the queue of each interface (in FIG. 5, only the interface 47 shown). The queue may be an incoming queue or an outgoing queue, but the case of monitoring an incoming queue 42 will be explained. The queue is a mechanism/functional portion holding packets PKTs for a while after being input until being sent out to the next processing.

When the congestion monitor unit 36 detects the state of congestion of the incoming queue 42, it instructs the route information packet generating unit 44 to notify the network address to which the interface in the congested state is connected to the other network relay apparatuses 21. An example of the packet used for this is shown in FIG. 22.

FIG. 22 is a view of an example of a congestion state delivery packet.

The frame structure of the packet in this figure is almost the same as that shown in FIG. 9 or FIG. 15. This congestion information delivery packet is generated by the route information packet generating unit 44 (FIG. 5) and transmitted from all transmitting ports (TX) to all routers. Further, this information is notified to the network relay apparatuses 21 in the network 11 hop by hop.

To show whether a path 12 is congested, for example, it is sufficient to use the two bits in the area "i" of FIG. 22 and make "01" indicative of congestion and "10" indicative of release of congestion. Further, the area "j" of the packet includes as information the network address of the network to which the related interface is connected.

Note that whether a packet is a congestion information delivery packet or another packet is indicated for example in the IPv4 header shown in FIG. 11 or the IPv6 header shown in FIG. 12 by setting specific values in the least significant two bits of the currently unused "Type of Service" field of IPv4 or the unused "Traffic Class" field of the IPv6. Alternatively, in the case of an IPv4 header, this may be judged by setting a value other than a value currently used in the "protocol" field. This is checked at the packet judging unit 41. If it is a congestion information delivery packet, this is sent to the route selection condition setting unit 33.

At this time, as the standard for judging the state of congestion, there is the method of judging that a state of congestion has occurred when the incoming queue 42 overflows with input data (packets PKT) and packets begin to be discarded. This is shown in FIG. 20.

Alternatively, there is the method of setting a threshold value of for example 80% of the entire length of the queue being filled with packets PKT in the congestion monitor unit 36 and judging that a state of congestion has occurred when it is filled to 80%. This is shown in FIG. 21.

In the former case (FIG. 20), it is judged that a state of congestion occurs when congestion is complete, so the following packets PKT naturally end up being discarded. There is the advantage however that 100% of the resources (here, the incoming queue) of the network relay apparatuses 21 may be used.

On the other hand, in the latter case (FIG. 21), it is judged for example that a state of congestion occurs at 80%, so there is a possibility of the remaining 20% of the queue not being used. Since the state of congestion is judged early, however, it is possible to reduce the possibility of packets of other data traffic being discarded.

The network relay apparatus 21 receiving the congestion information delivery packet (FIG. 22) sends this congestion information to the route selection condition setting unit 33 (FIG. 5) and adds this congestion information to the routing/bandwidth information database 45 (FIG. 5). An example of this is shown in FIG. 23.

FIG. 23 is a view illustrating an example of the data held in the routing/bandwidth information database 45 to which the congestion information is further added.

This figure shows an example of addition of congestion information to the database 45 of FIG. 13. In this figure, it is shown that a state of congestion occurs in the network 5 of FIG. 6, that is, between the router 3 and the router 5.

In this case, in the router 3 as well, the network 5 has an information of "not available", so the route of Route No. 6 which does not overlap with the transmission route of the multimedia data Dm shown in FIG. 16 is selected. The route selection condition setting unit 33 (FIG. 5) in this case becomes for example as shown in FIG. 24.

FIG. 24 is a view illustrating the concept of the setting function of the route selection condition setting unit 33.

The figure should be viewed in the same way as in FIG. 14. In the area (d), however, the condition that "do not pass through a congested route" is added.

Figure 25:
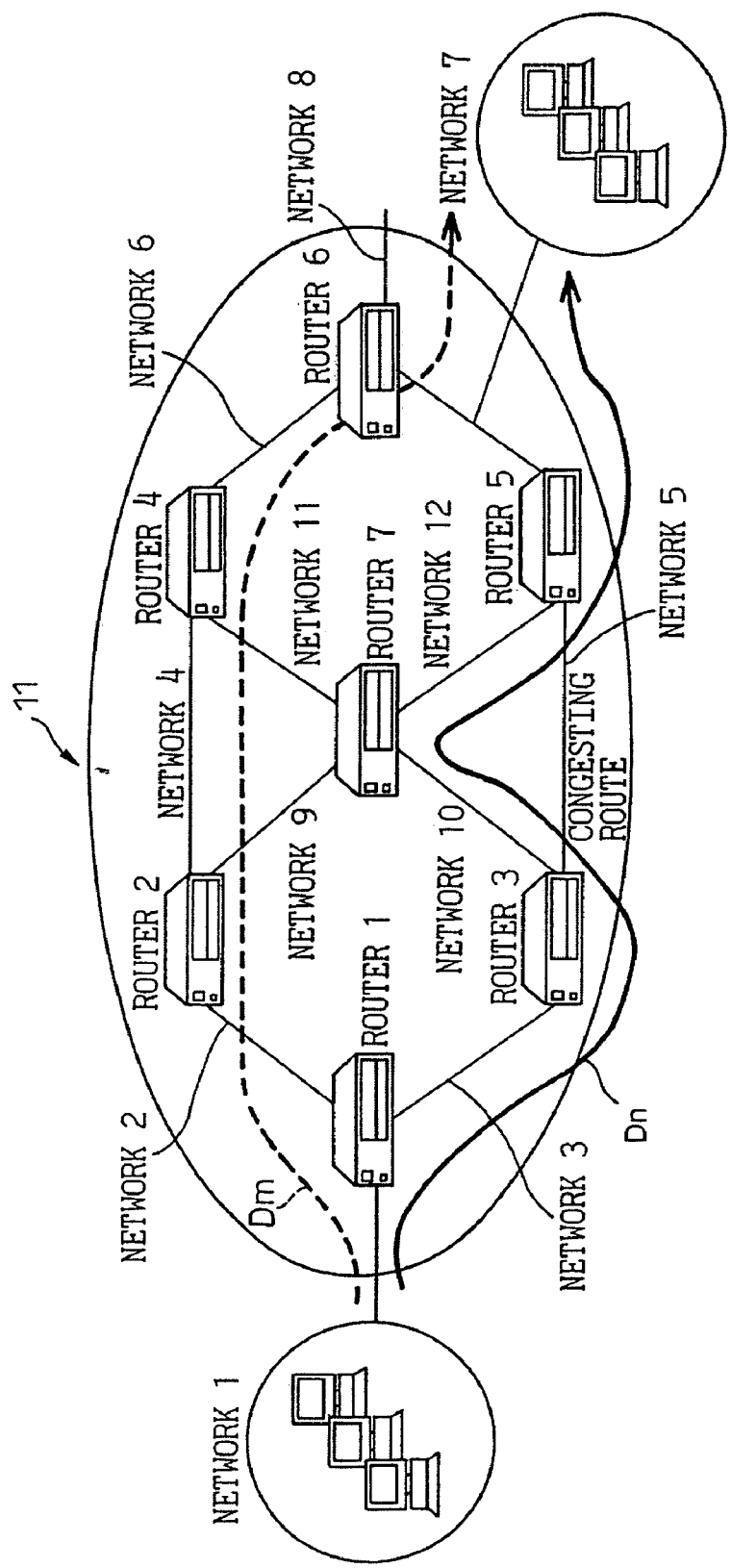
FIG. 25 is a view of the state of selection of the optimal route taking into consideration congestion based on the present invention.

Therefore, the optimal route becomes as shown in FIG. 25 for example.

FIG. 25 is a view of the state where the optimal route is selected considering the congestion information according to the present invention.

This figure should be viewed in the same way as in FIG. 16. In the case of FIG. 25, however, it is learned from the congestion information (X) of FIG. 23 that there is congestion in the route going through the router 3 and the router 5, So unlike in FIG. 16, a route bypassing the network 5 is selected.

Above, the explanation was made of a specific example of selection of the optimal route of packets in accordance with the type of data of the packets based on at least the bandwidth information and the congestion information, so next an explanation will be given of how to discriminate and classify the "type of data", that is, how the discriminating means 13 of FIG. 1 discriminates the "type of data".

Listing all of the parameters for discrimination again, the discriminating means 13 can discriminate the type of the data transmitted over the plurality of paths 12 based on at least one of:

(a) a destination address of the input data,
(b) a destination network address of the input data,
(c) a sender address of the input data,
(d) a sender network address of the input data,
(e) a destination port number of the input data,
(f) a protocol number of the input data, and
(g) a receiving interface of the input data. Each will be explained in detail below.

As explained in FIG. 3 as well, when the network relay apparatus 21 receives a data packet PKT, it classifies the packet by type of data in the packet discriminating unit 31 based on the information set in the classification condition setting unit 32.

(a) Destination Address

First, it is possible to differentiate a packet by investigating the destination address of the packet in the packet discriminating unit 31. The condition of data to which address is to be transmitted over a route other than an ordinary route is set in the classification condition setting unit 32 and referred to for classification.

This can be applied to, for example, the case where, in client-server communication, if a packet is designated with address of a server/host computer, the packet should be transmitted over a certain route.

(b) Destination Network Address

Alternatively, when separating transmission routes for each data addressed to a specific subnetwork 23, the packet may be classified based on the address of the destination subnetwork. For example, in server-client communication, when the number of clients is extremely large and the clients have been linked with a single subnetwork or a plurality of subnetworks, if classifying a packet based on the subnetwork information, it is no longer necessary to designate all network addresses to classify a packet and therefore the efficiency is improved.

That is, the above (a) and (b) are effective when applied to the case of selecting the routes for traffic in server-client type applications all together.

(c) Sender Address and (d) Sender Network Address

Alternatively again, by a concept opposite to the above, it is possible to classify traffic by designating the sender address for separation of data from the server or by designating the sender network address for separation of data from the clients.

(e) Destination Port Number

Further, as the protocol to be used for communication of backbone jobs, there are the Systems Network Architecture (SNA), Fujitsu Network Architecture (FNA), etc. Here, in the case of (i) SNA on TCP/IP, the port number is 108 (SNA Gateway Access Server) or 1439 (/tcp Eicon X25/SNA Gateway). On the other hand, in the case of (ii) FNA on TCP/IP, the port number is 492/493 (Transport Independent Convergence for FNA). These are predetermined by assignment of the IANA. Therefore, it is possible to classify a target packet by these destination port numbers. Note that in general http, 80 is used as the destination port number.

(f) Protocol Number

Alternatively, as already touched upon, there is the method of classifying a packet by the protocol number in the IP header. For example, spreadsheet data or http use the TCP. The protocol number for this is "6". Further, multimedia data such as audio and moving pictures use the UDP. The protocol number for this is "17". It is possible to use these to classify packets and transmit them over separate routes.

(g) Receiving Interface

Further, a certain interface (47 to 49) of a certain network relay apparatus 21 will be connected to a data center installed in the host computer or server etc. At this time, the packets received at the interface will mostly be transmitted over the same route. Therefore, it is possible to group packets for each receiving interface of packets and send them over the same routes and to send packets received at other interfaces by other routes. In this case, the load for the packet classification at the network relay apparatuses 21 becomes much lighter.

Further, when finer control of the classification is required, it is possible to suitably combine and use any of the above (a) to (g). For example, when desiring to transmit FNA and http by a special route, it is possible to classify the packets by designating the protocol number "6" (TCP), the destination port number "492/493" (FNA), and "80" (http).

This completes the detailed explanation of the network system and network relay apparatuses according to the present invention.

Next, an explanation will be given of the network relay monitor apparatus and method of network operation according to the present invention.

Figure 26:
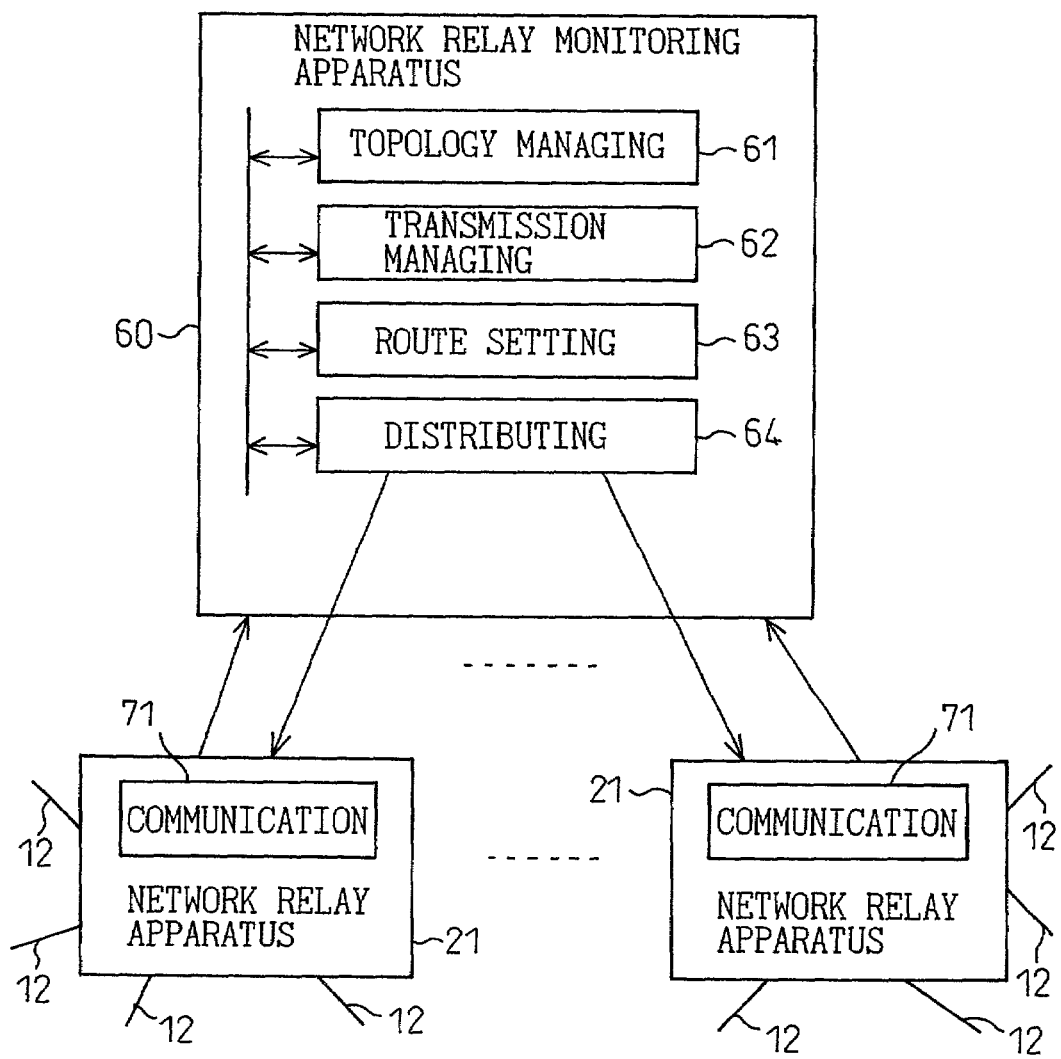
FIG. 26 is a view of the configuration of a network relay monitoring apparatus according to the present invention.

FIG. 26 is a view of the configuration of a network relay monitor apparatus according to the present invention.

The network relay monitor apparatus 60 of the present invention shown in the figure is a network relay monitor apparatus for centrally monitoring a plurality of network relay apparatuses 21 and a network which is comprised of a plurality of paths 12 for transferring data (packets) laid among the plurality of network relay apparatuses 21. The apparatus 60 is provided with a topology managing means 61 for managing a topology of the network 11, a transmission managing means 62 for managing transmission capacities of the plurality of paths 12, a route setting means 63 for setting the optimal route among the routes of data to be transferred through the plurality of paths 12 in accordance with the type of the data (TCP and UDP) based on information provided from the topology managing means 61 and the transmission managing means 62, and a distributing means 64 for distributing route setting information of the route setting means 63 to the plurality of network relay apparatuses 21.

Specifically, the apparatus 60 functions as follows:

The network relay monitor apparatus 60 originally holds information relating to the topology and transmission capacities or collects the information through communicating means 71 of the network relay apparatuses 21 provided from the network relay apparatuses 21.

Here, the information relating to the transmission capacities is bandwidth information Ib held in the network relay apparatuses 21 or congestion information Ic transmitted from the network relay apparatuses 21 via the communicating means 71.

The apparatus 60 updates the information on the optimal route and distributes it to the plurality of network relay apparatuses 21 by the distributing means 64 when receiving congestion information Ic from the network relay apparatuses 21.

Figure 27:
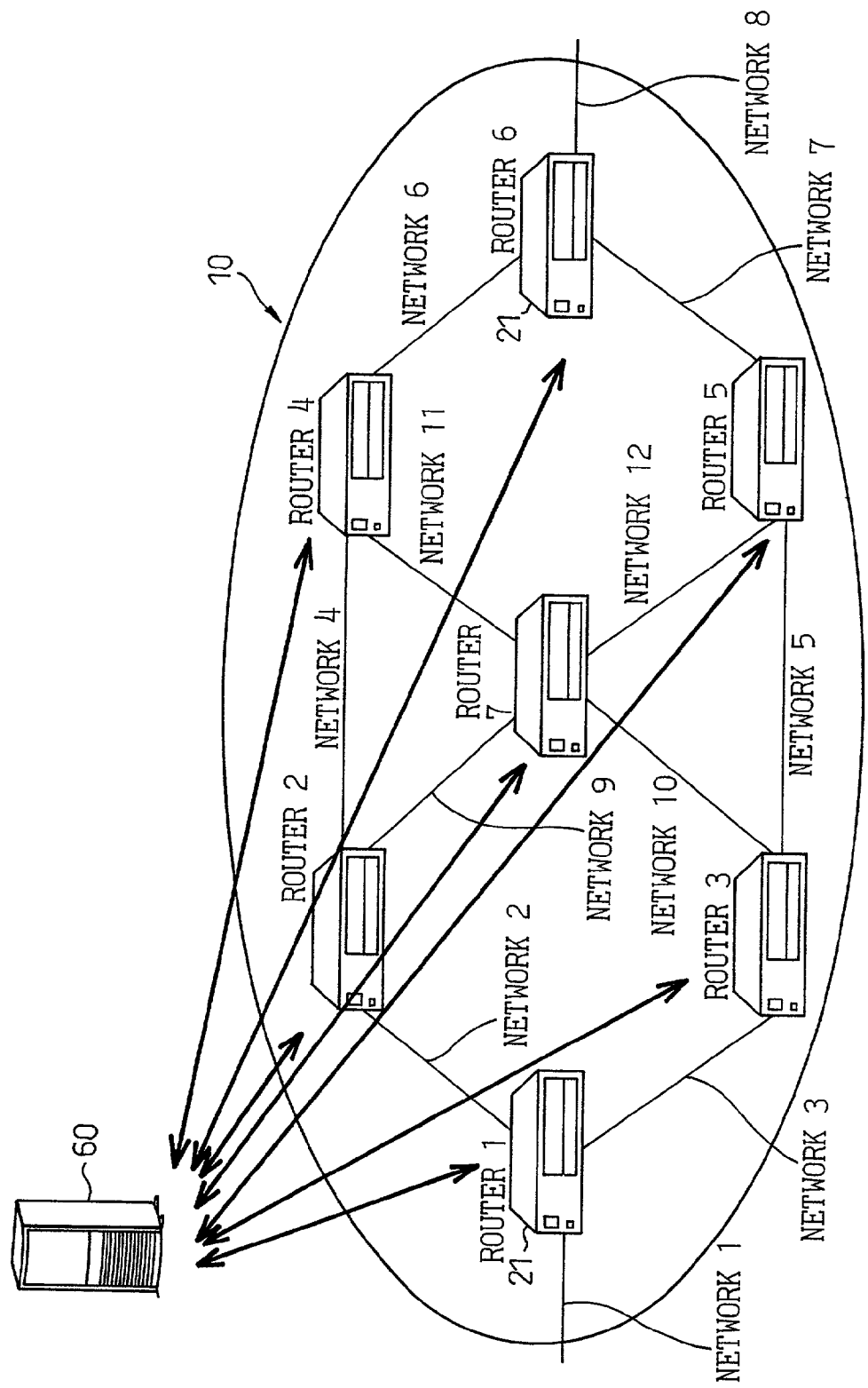
FIG. 27 is a view of an example of a network system 10 of the network relay monitoring apparatus 60 according to the present invention.

The position of the network relay monitor apparatus 60 will be more easily understood from FIG. 27.

FIG. 27 is a view of an example of a network system 10 having the network relay monitor apparatus 60 according to the present invention.

Mainly, it is possible to provide dedicated hardware such as a network server to perform processing covering the scope of a certain ISP or carrier or corporate network for the purpose of reducing the processing load of the network relay apparatuses 21 and reducing the management costs by central management. FIG. 27 shows the configuration in the case of application of this.

In this case, the central control dedicated hardware, that is, the network relay monitor apparatus 60, collects the OSPF and other routing protocol messages to obtain a grasp of the topology in the network 11, collects the bandwidth and congestion information (Ib and Ic) of the routes to generate a database the same as the routing/bandwidth information database 45 shown in FIG. 5, and distributes the same to the network relay apparatuses 21 once again. Further, it updates the content of the database and redistributes it by the distributing means 64 every time there is a change in the content of the database such as the change in the network topology or the congestion information.

That is, when setting the addresses in the central control dedicated hardware (60) and there is a change in the information, the network relay apparatuses 21 notify the central control dedicated hardware (60) of the changes by transmitting the data from the communication means 71.

The routing protocol messages may be collected by receiving them at the multicast addresses to which the messages are sent or by loading the OSPF in the hardware (60) and operating it as an OSPF message listener node (a node which does not perform routing operations, but collects messages).

The central control dedicated hardware (60) updates a database, the same as the bandwidth/congestion information database 43 of FIG. 5, based on the above information and distributes it to the network relay apparatuses 21.

If the number of the network relay apparatuses 21 is relatively small, it is sufficient to transmit the updated information by unicasting to each apparatus 21, but if the number is large, it is possible to utilize the method of multicasting.

Further, the already mentioned route selection conditions, that is, of which traffic (data packets) is to be transferred by what route of what condition can be collected by the network relay apparatuses 21 accommodating the customers or can be centrally managed to distribute by this hardware (60) to other apparatuses 21 in accordance with customer requests.

Due to this, each network relay apparatus 21 does not have to notify the network 11 of the bandwidth information of its own interfaces (47, 48, and 49) or similarly notify it of congestion information or update the bandwidth/congestion information database along with changes in information. Therefore, it is possible to reduce the processing load by that amount and possible to concentrate the resources of the network relay apparatus 21 such as the internal CPU or memory for packet transmission processing.

Above, an explanation was given of a network system or network relay apparatus selecting routes in the network using bandwidth information and avoid controlling routes to congestion. Next, an explanation will be made of the method of network operation of the present invention using network relay apparatuses equipped with these functions.

This method of network operation is a method of operation in a network system 10 including at least a plurality of network relay apparatuses 21 connected to a plurality of subnetworks 23 linked with a network 11 and a service provider (S in FIG. 6) for providing a service to users under the subnetworks 23 through the network relay apparatuses 21, comprising configuring each network relay apparatus 21 by a discriminating means 13 for discriminating the type of data transferred over a plurality of paths 12 comprising the network 11, a selecting means 14 for selecting the optimal route of the paths 12 for each data in accordance with the type discriminated for each data and its destination based on bandwidth information for each path 12 collected in advance, and a holding means 15 for holding optimal path routing information for each type of data and destination selected by the selecting means 14 and giving the network relay apparatus 21 the function of forwarding received data toward the optimal route of paths in accordance with the routing information in the holding means 15 and having the service provider S thereby provide at least one of a low delay guarantee/low packet loss rate guarantee service and virtual private network load sharing service.

That is, by using the network relay apparatus 21 of the present invention for communication by the dynamic optimal route in accordance with the properties of the traffic or the type of data and thereby keeping down the packet delay and reducing the packet discard rate, a service providing an excellent quality of communication and response is realized. Further, by using different routes for different traffic, a quasi load sharing service is provided.

Figure 28:
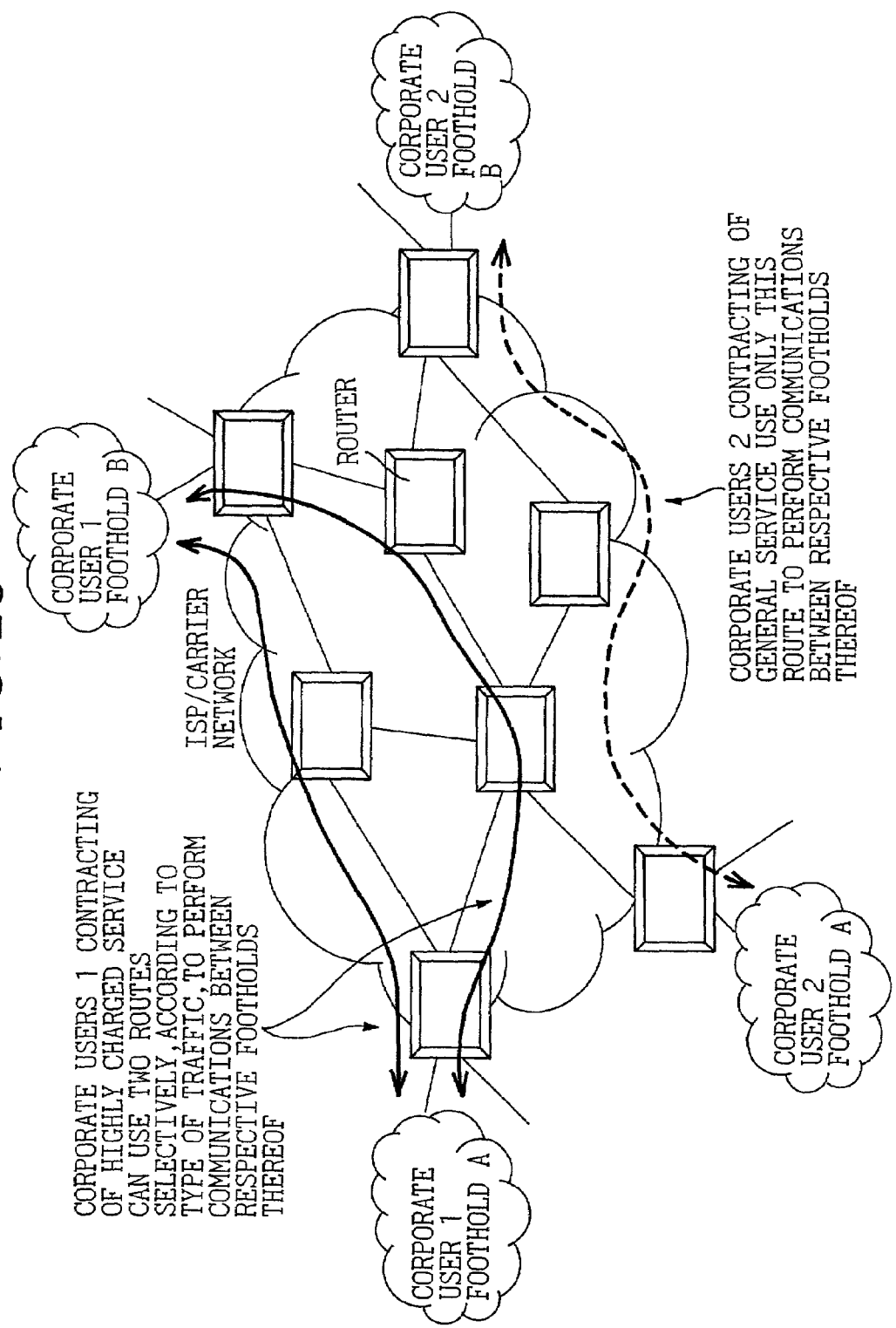
FIG. 28 is a view of an example of a service model using the method of network operation of the present invention.

FIG. 28 is a view of an example of a service model using the method of network operation of the present invention.

As shown in FIG. 28, a network relay apparatus 21 equipped with the functions of the present invention is arranged in a network including an ISP or carrier (service provider S).

Due to the optimal route selection function provided by this, the service of charging a higher amount than the charge of a usual contractor to an individual user or corporate user contracting for a low delay or a low packet discard rate or provided with a load sharing function for each type of traffic is provided. Therefore, provision of a rich variety of services becomes possible and the service provider can set itself apart from other service providers not using the present invention.

In FIG. 28, the corporate user 1 is a user contracting for an optimal route selection/load sharing service (being guaranteed a packet discard rate in the network 11 of less than xx % or a delay in the network 11 of only the multimedia data Dm of less than xx ms or having access to a substantially double bandwidth by transmitting the traffic A and B by separate routes), while the corporate user 2 is a user contracting for a usual connection service.

At this time, the corporate user 2 transmits all traffic for point-to-point communication by just the ordinary routing routes, while the corporate user 1 transmits for example spreadsheet data using a route not used by corporate users contracting for ordinary service and transmits multimedia data Dm by another route with a larger bandwidth. In other words, it is possible to obtain service allowing a plurality of routes to be selectively used in accordance with the type of traffic.

Due to this, the corporate user 2 receives an inexpensive, but not that good quality or response communication service, while the corporate user 1 can receive a service where packets of spreadsheet data are transmitted by a discard rate of less than xx % or a service where the delay of the multimedia data Dm in the network is held to less than xx ms or, further, a quasi load sharing service where different types of traffic are transmitted over separate routes.

Changing the perspective, the corporate user 1 uses a substantially double bandwidth.

Here, it is assumed that the packet discard rate of spreadsheet data and the delay time of multimedia data are used as the service parameters between the ISP and corporate user 1.

The initial network relay apparatus 21 to which the corporate user 1 is connected counts the total number of packets transmitted from the corporate user 1 (number of incoming packets) as statistical information and counts the total number of packets going out from the ISP network by edge routers (network relay apparatuses located at positions where the packets leave the ISP) as statistical information.

By totaling up these, the total number of packets leaving the ISP network (number of outgoing packets) is calculated. This being so, the packet discard rate is found as (1−number of outgoing packets/number of incoming packets)×100.

Further, the initial network relay apparatus 21 to which the corporate user 1 is connected records the time t1 of for example the initial packet of the multimedia data packets transmitted from the corporate user 1 and the time t2 when that packet leaves the ISP network. The delay time is found as t2−t1.

The two values of the packet discard rate and the delay time are collected for example each month at an ISP network management center managing the customers, calculating charges, or maintaining the server/network. The charging system is set in accordance with these values. Alternatively, when the contracted discard rate cannot be protected, part of the charges is returned from the ISP to the user in accordance with the rate.

For example, it is possible to provide a service partially refunding contract charge such as shown in the following table when the contracted terms are a discard rate of less than 1%/delay of less than 1 ms:

TABLE 1

Delay Time Guarantee/Discard Rate Guarantee Service

| Discard rate (%) | Repayment (% of contract charge) | | |
|---|---|---|---|
| | Delay of less than 1 ms | Delay of as 1 to 5 ms | Delay of 5 to 10 ms |
| Less than 1 | 0 | 1 | 5 |
| 1 to 5 | 1 | 5 | 10 |
| 10 or more | 5 | 10 | 15 |

Further, it is possible to provide the user with a rich variety of services such as (a) a guaranteed discard rate service and guaranteed delay service, (b) only a guaranteed discard rate service, and (c) only a guaranteed delay service.

Further, it is possible to provide a load sharing service menu designating types of traffic such as (d) a load sharing service strictly guaranteeing the quality of communication by using of separate routes for multimedia data and other traffic at all times and (e) a plurality of virtual load sharing services in accordance with the number of types of traffic using classified and separated routes.

In this case, in actuality, usage of the network is made more efficient to provide a quasi load sharing service. Two lines are not actually contracted for. Therefore, it is possible for example to keep the contract charge to 1.2 to 1.5 times the usual charge or possible to provide a more inexpensive service than other ISPs providing load sharing services with two lines, so more competitive business can be realized.

Further, it is possible to provide services never existing before such as the provision of services by a fee schedule set in accordance with the number of types of traffic using different routes.

Due to the above, according to the present invention, it becomes possible to realize a diverse variety of services or business models. This is shown in FIG. 29.

Figure 29:
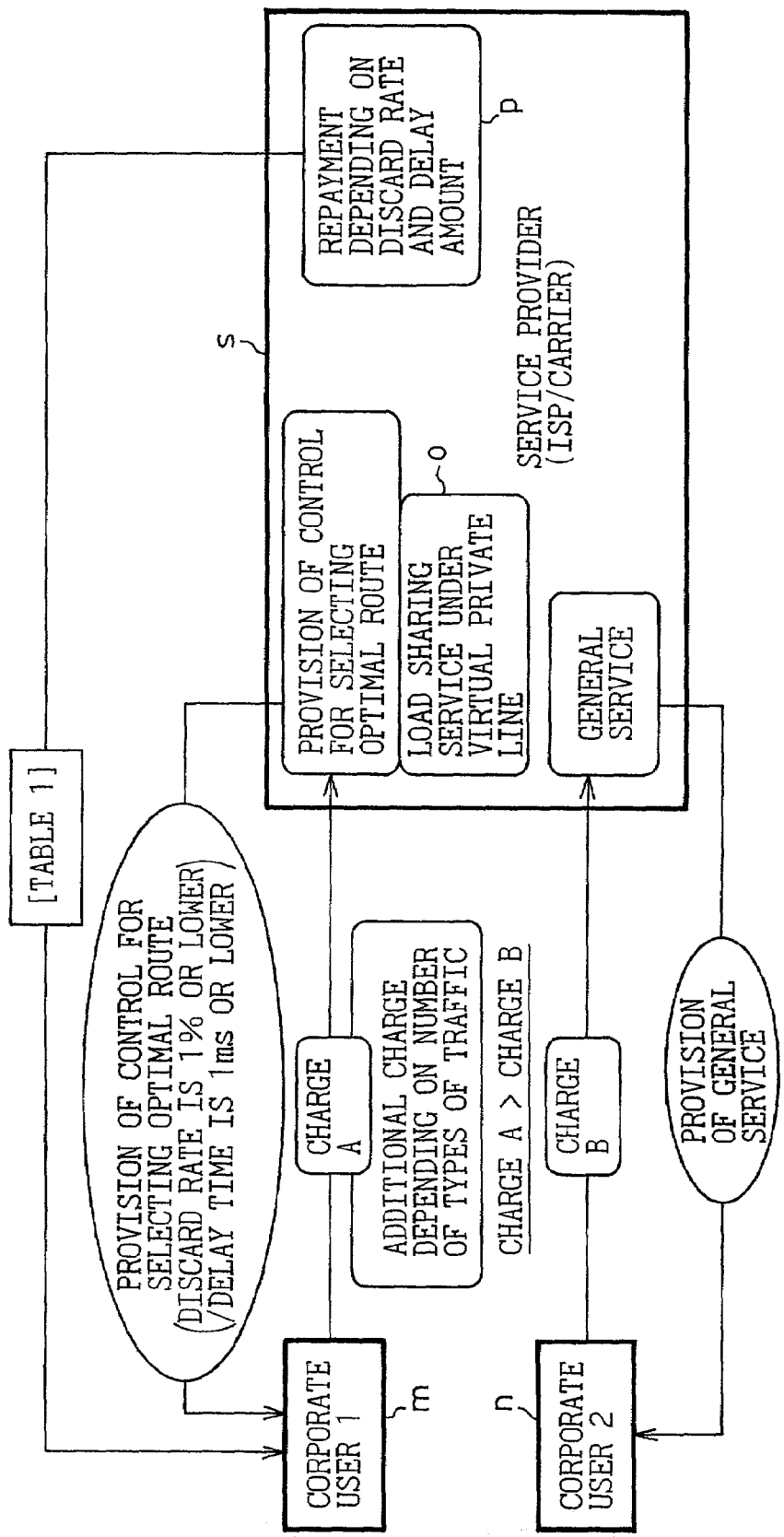
FIG. 29 is a view illustrating a service system utilizing control for selection of the optimal route of the present invention.

FIG. 29 is a view illustrating a service system using control for selection of the optimal route according to the present invention.

The flow of the charges between a user and ISP and the flow of service by the same when contracting for a service for avoiding congestion or a service guaranteeing less than a certain discard rate provided by the ISP are shown.

In the figure, "m" is a corporate user 1 benefiting from the control for selection of the optimal route according to the present invention, while "n" is an ordinary corporate user 2 not benefiting from it.

The corporate user 1 can obtain the virtual private network load sharing service "o" by paying a higher charge A (A>B) than the ordinary charge B. Further, it can obtain the low delay guarantee/low packet loss rate guarantee service "p". If this guarantee is not honored, the corporate user 1 is paid a penalty according to the above Table 1. This service has never existed before.

Finally, the TCP slow start algorithm explained in the section on the related art will be additionally explained.

Figure 30:
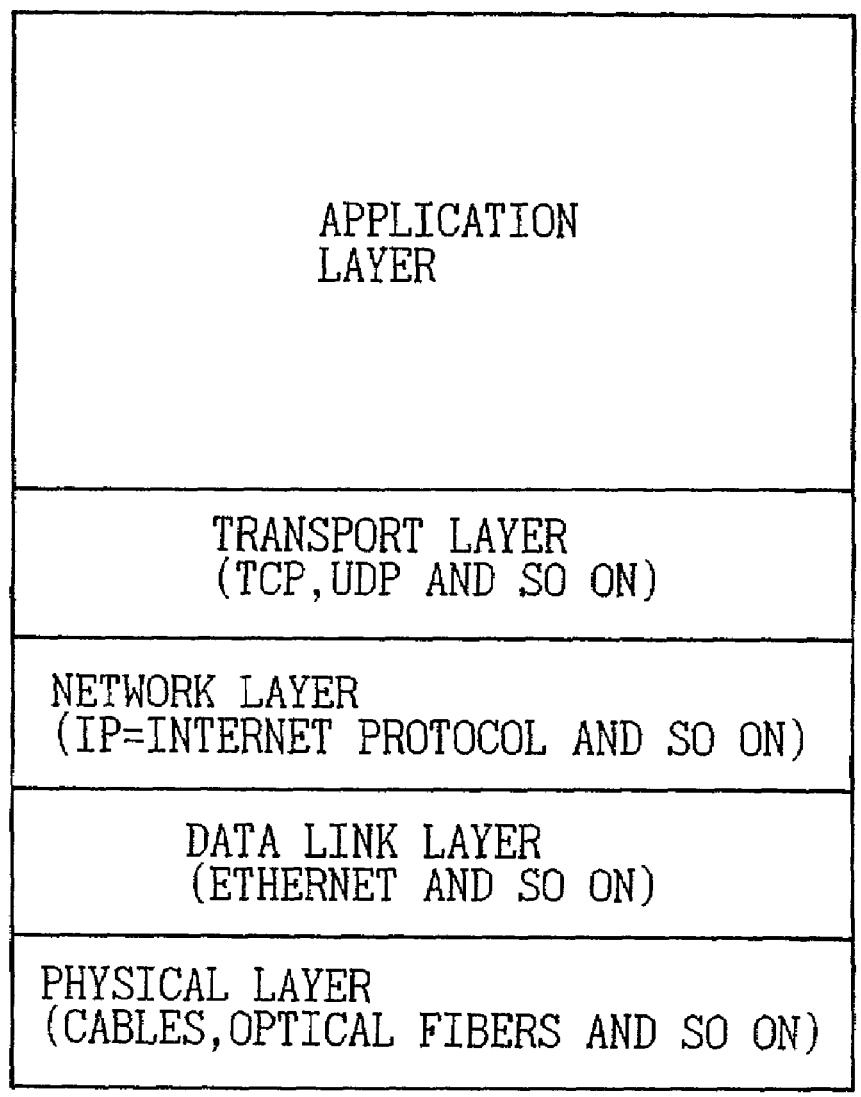
FIG. 30 is a view of a known protocol stack.
Figure 31:
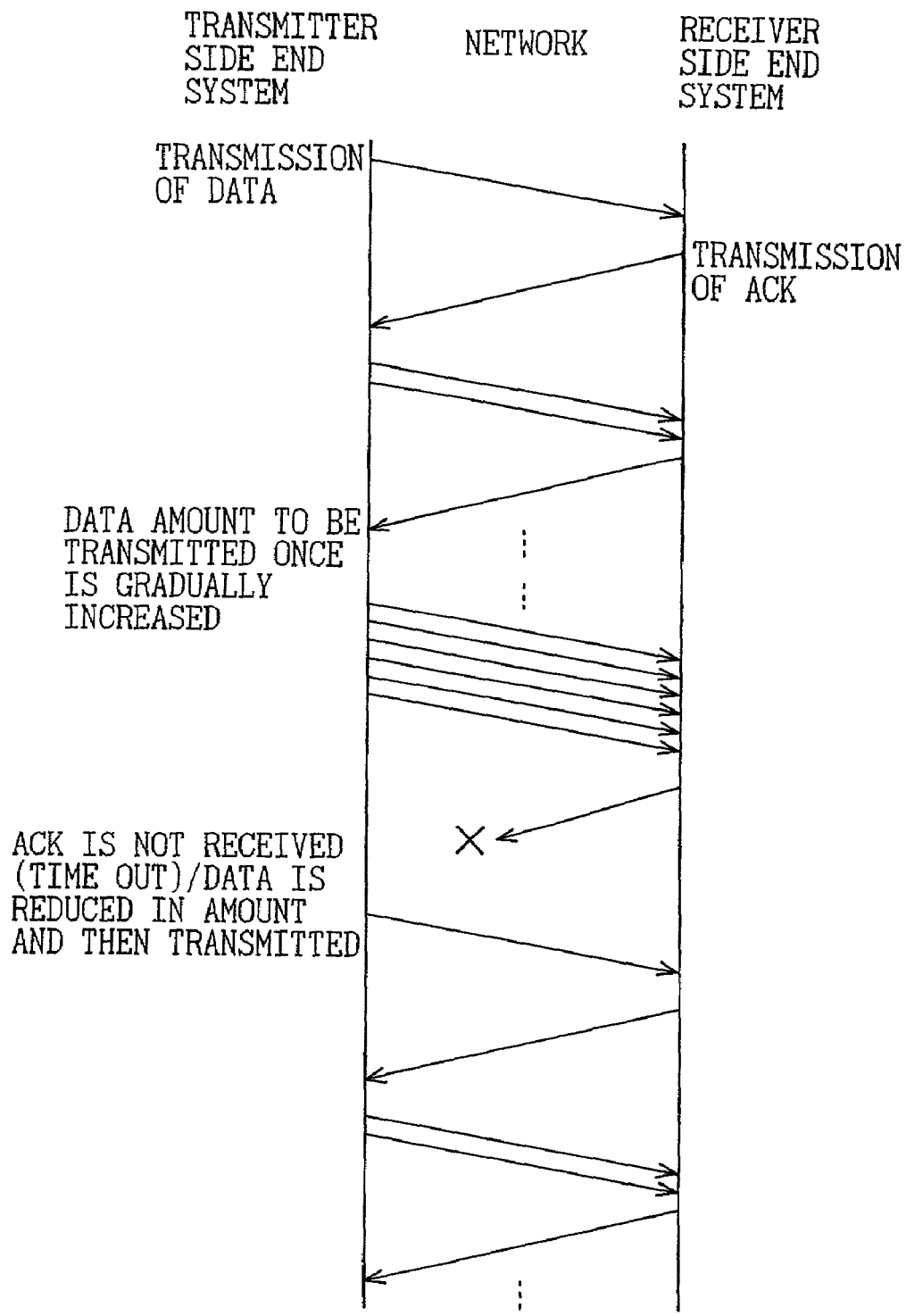
FIG. 31 is a view of the general sequence of a TCP slow start algorithm.
Figure 32:
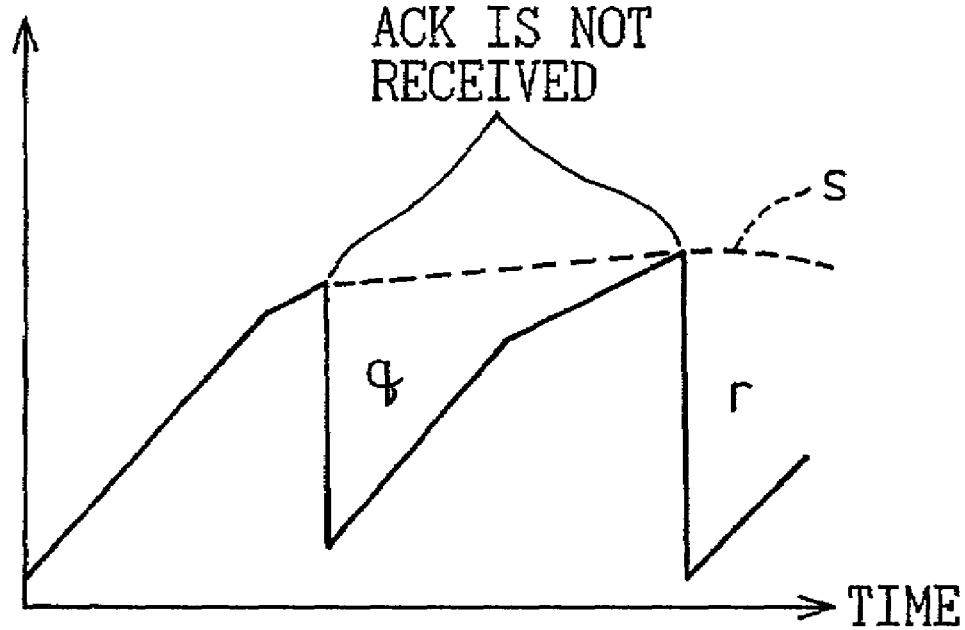
FIG. 32 is a graph of the sequence of FIG. 31.

FIG. 30 is a view of a known protocol stack, FIG. 31 is a view of a general sequence of a TCP slow start algorithm, and FIG. 32 is a graph of the sequence of FIG. 31.

Note that FIG. 30 shows only the position of the layer where the TCP and UDP are present, mainly covered by the present invention, that is, the transport layer, in the protocol stack.

In conclusion, as shown in FIG. 32, in the past, there was the defect of deep drops in the amount of data such as "q" or "r". The present invention can avoid these deep drops ("q" and "r") as shown by the broken line.

With the TCP/IP, communication is first started assuming that the data transmission rate which the network 11 will allow might be extremely slow. The data is transmitted starting by sending one smallest packet and gradually increasing the amount of data transmitted. If packets are discarded etc. due to congestion in the network 11 in the middle of this and a acknowledgment (ACK) is not returned for transmitted data, the amount of data sent is sharply reduced once ("q" or "r" in FIG. 32). Gradually increasing the amount of data transmitted again after this is called the "slow start algorithm".

In this case, to ease the congestion in the network 11, in the worst case, the TCP module of the end system returns the amount of data transmitted to zero once and then gradually increases the amount of data sent. Therefore, at the zero point of time, even if the network 11 is not in a congested state or there is another route not in a congested state, the amount of data transmitted at the sender end system ends up being reduced. Further, there is no mechanism for dynamically sending data by another route at the TCP or the network 11 side. Therefore, efficient communication is not possible.

Summarizing the effects of the invention, technique has not yet been established in which the apparatuses comprising the network system 10 perform controls of routings taking into consideration bandwidth information Ib and congestion information Ic of the network as a whole. This will become an important issue in the future. If this technology is established, it will play an important role in the development of new services.

IP virtual private network services (IP-VPN services) are expected to be increasingly provided by service providers (carriers)in the future. The related markets will probably also rapidly expand. Considering this, development of high performance traffic engineering techniques considering bandwidth and congestion as well such as in the present invention, rather than provision of simple IP-VPN services, will become most important.

(i) According to the present invention, it is possible to provide the function of selecting the optimal route in accordance with the type of traffic in the Internet, intranets, and ISP or carrier IP service networks and other IP networks. This will become an important function for IP data communication networks in the future. Further, it is possible to realize a high quality of data communications using this. In addition, it is possible to provide virtual load sharing transmission functions never before existing and possible to improve the quality of communications, increase the efficiency of communications, and realize effective usage of network resources. The present invention can therefore contribute remarkably to the further development of data communications.

(ii) Further, the present invention can be utilized as a function effective for alleviation of one of the unsolved problems remaining in current IP communications, traffic engineering, and for improving QoS routing for dynamically transmitting data by a route able to guarantee a requested QoS and therefore can contribute greatly to the improvement of functions and spread of the Internet in the future.

(iii) Further, while an IP connection service of carriers or ISPs is particularly provided, it is possible to add a communications service introducing the technology of the present invention and able to select the optimal route in a network for each type of traffic. That is, by efficient utilization of the network, it is possible to provide customers with a quality assurance service such as a "low delay guarantee/low packet loss rate guarantee service" for the IP traffic of users and possible to provide new services never seen before such as a "virtual load sharing service" of providing quasi load sharing by control in the network while contracting for a single line instead of the load sharing of the past realized by contracting for a plurality of lines, so there would be a major effect on the capital investment of both the user side and the service provider side.

While the invention has been described with reference to specific embodiments chosen for purpose of illustration, it should be apparent that numerous modifications could be made thereto by those skilled in the art without departing from the basic concept and scope of the invention.

What is claimed is:

1. A network relay apparatus comprising:
 a discriminating means for discriminating the type of data transferred over a plurality of paths comprising a network;
 a selecting means for selecting the optimal route of the paths for each data in accordance with the type discriminated for each data and its destination based on bandwidth information and congestion information for each path collected in advance; and
 a holding means for holding optimal path routing information for each type of data and destination selected by the selecting means, said apparatus forwarding received data toward the optimal route of paths in accordance with the routing information in the holding means, wherein
 said network relay apparatus is provided with a congestion monitor unit for monitoring the states of congestion of data received from the paths,
 a bandwidth information/congestion information packet generating unit for generating a packet forwarding the congestion information detected by this monitoring and the bandwidth information showing the bandwidth of the paths connected to itself toward the other network relay apparatuses, the selecting means is comprised of, so as to sequentially collect congestion information for each path and select the optimal route of the paths for each data by referring to both the bandwidth information and congestion information, a route selection condition setting unit for setting a condition for selecting the optimal route of paths for transfer of each data separated in accordance with a data classification condition serving as a reference for discrimination of the type of data based on bandwidth information and congestion information obtained from other network relay apparatuses and makes the holding means hold the optimal route selected in accordance with the route selection condition setting unit.

2. A network relay apparatus as set forth in claim 1, wherein the discriminating means is comprised of a packet discriminating means for discriminating the type of the data received from the paths and classifying and separating the packets and a classification condition setting unit for setting the classification conditions for the data serving as the reference for discrimination.

3. A network relay apparatus as set forth in claim 1, wherein the holding means is comprised of a routing table.

4. A network relay apparatus as set forth in claim 1, wherein said bandwidth information which said selecting means refers to for selecting the optimal route of paths is defined as one parameter from among:
   (a) the minimum value in the bandwidths of the plurality of paths on a route, that is, the minimum bandwidth,
   (b) the average value of the bandwidths of a string of paths along a route, that is, the average bandwidth, and
   (c) the maximum value of the bandwidths of a string of paths along a route, that is, the maximum bandwidth.

5. A network relay apparatus as set forth in claim 1, wherein said selecting means selects the optimal route of paths for each data by referring to information on the number of passing through hops unique to each route in addition to said bandwidth information and said congestion information.

6. A network relay apparatus as set forth in claim 1, wherein said discriminating means discriminates the type of the data transmitted over the plurality of paths based on at least one of:
   (a) a destination address of the input data,
   (b) a destination network address of the input data,
   (c) a sender address of the input data,
   (d) a sender network address of the input data,
   (e) a destination port number of the input data,
   (f) a protocol number of the input data, and
   (g) a receiving interface of the input data.

7. A method of network operation in a network system including at least a plurality of network relay apparatuses connected to a plurality of subnetworks linked with a network and a service provider for providing a service to users under the subnetworks through said network relay apparatuses, comprising configuring each said network relay apparatus by a discriminating means for discriminating the type of data transferred over a plurality of paths comprising the network, a selecting means for selecting the optimal route of the paths for each data in accordance with the type discriminated for each data and its destination based on bandwidth information and congestion information for each path collected in advance, and a holding means for holding optimal path routing information for each type of data and destination selected by the selecting means, said network relay apparatus forwarding received data toward the optical route of paths in accordance with the routing information in the holding means, being provided with a congestion monitor unit for monitoring the states of congestion of data received from the paths, and a bandwidth information/congestion information packet generating unit for generating a packet forwarding the congestion information detected by the monitoring and the bandwidth information showing the bandwidth of the paths connected to itself toward the other network relay apparatuses, wherein the selecting means is comprised of, so as to sequentially collect congestion information for each path and select the optimal route of the paths for each data by referring to both the bandwidth information and congestion information, a route selection condition setting unit for setting a condition for selecting the optimal route of paths for transfer of each data separated in accordance with a data classification condition serving as a reference for discrimination of the type of data based on bandwidth information and congestion information obtained from other network relay apparatuses and makes the holding means hold the optimal route selected in accordance with the route selection condition setting unit, giving said network relay apparatus the function of forwarding received data toward the optimal route of paths in accordance with the routing information in the holding means and having said service provider thereby provide at least one of a low delay guarantee/low packet loss rate guarantee service and virtual private network load dispersion service.

* * * * *